United States Patent
Sun et al.

(10) Patent No.: US 12,130,887 B2
(45) Date of Patent: Oct. 29, 2024

(54) SEMANTIC SEGMENTATION NETWORK STRUCTURE GENERATION METHOD AND APPARATUS, DEVICE, AND STORAGE MEDIUM

(71) Applicant: Tencent Technology (Shenzhen) Company Limited, Shenzhen (CN)

(72) Inventors: Peng Sun, Shenzhen (CN); Jiaxiang Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 608 days.

(21) Appl. No.: 17/515,180

(22) Filed: Oct. 29, 2021

(65) Prior Publication Data
US 2022/0051056 A1 Feb. 17, 2022

Related U.S. Application Data

(63) Continuation of application No. PCT/CN2020/114372, filed on Sep. 10, 2020.

(30) Foreign Application Priority Data

Nov. 12, 2019 (CN) .......................... 201911102046.3

(51) Int. Cl.
*G06K 9/62* (2022.01)
*G06F 18/21* (2023.01)
(Continued)

(52) U.S. Cl.
CPC .......... *G06F 18/214* (2023.01); *G06F 18/217* (2023.01); *G06F 18/253* (2023.01);
(Continued)

(58) Field of Classification Search
CPC .... G06V 10/26; G06V 10/267; G06V 10/454; G06V 10/70; G06V 10/764; G06V 10/77;
(Continued)

(56) References Cited

U.S. PATENT DOCUMENTS 10,095,977 B1 10/2018 Kim et al.
10,769,744 B2 * 9/2020 Poudel Karmatha ....................... G06V 10/764

(Continued)

FOREIGN PATENT DOCUMENTS

CN 103984953 A 8/2014
CN 107679502 A 2/2018
(Continued)

OTHER PUBLICATIONS

Tencent Technology, WO, PCT/CN2020/114372, Dec. 8, 2020, 5 pgs.
(Continued)

*Primary Examiner* — Eric Rush
(74) *Attorney, Agent, or Firm* — Morgan, Lewis & Bockius LLP

(57) ABSTRACT

This application provides a semantic segmentation network structure generation method performed by an electronic device, and a non-transitory computer-readable storage medium. The method includes: generating a corresponding architectural parameter for cells that form a super cell in a semantic segmentation network structure; optimizing the semantic segmentation network structure based on image samples, and removing a redundant cell from a super cell to which a target cell pertains, to obtain an improved semantic segmentation network structure; performing, by an aggregation cell in the improved semantic segmentation network structure, feature fusion on an output of the super cell; performing recognition processing on a fused feature map, (Continued)

to determine positions corresponding to objects that are in the image samples; and training the improved semantic segmentation network structure based on the positions corresponding to the objects that are in the image samples and annotations corresponding to the image samples, to obtain a trained semantic segmentation network structure.

20 Claims, 9 Drawing Sheets

(51) Int. Cl.
    *G06F 18/214*     (2023.01)
    *G06F 18/25*     (2023.01)
    *G06N 3/04*     (2023.01)
    *G06N 3/082*     (2023.01)
    *G06T 7/70*     (2017.01)
    *G06V 10/26*     (2022.01)
    *G06V 10/70*     (2022.01)
    *G06V 10/80*     (2022.01)
    *G06V 10/82*     (2022.01)
    *G06V 20/40*     (2022.01)
    *G06V 20/70*     (2022.01)
(52) U.S. Cl.
    CPC .............. *G06N 3/04* (2013.01); *G06N 3/082* (2013.01); *G06T 7/70* (2017.01); *G06V 10/267* (2022.01); *G06V 10/70* (2022.01); *G06V 10/806* (2022.01); *G06V 10/82* (2022.01); *G06V 20/41* (2022.01); *G06V 20/70* (2022.01); *G06T 2207/20084* (2013.01)
(58) Field of Classification Search
    CPC .... G06V 10/774; G06V 10/776; G06V 10/80; G06V 10/803; G06V 10/806; G06V 10/82; G06V 20/41; G06V 20/52; G06V 20/53; G06V 20/54; G06V 20/56; G06V 20/58; G06V 20/588; G06V 20/70; G06V 40/161; G06V 2201/06; G06V 2201/07; G06V 2201/08; G06T 7/10; G06T 7/11; G06T 7/70; G06T 2207/20081; G06T 2207/20084; G06F 18/211; G06F 18/2111; G06F 18/2113; G06F 18/2115; G06F 18/213; G06F 18/214; G06F 18/217; G06F 18/24; G06F 18/25; G06F 18/251; G06F 18/253; G06N 3/02; G06N 3/04; G06N 3/045; G06N 3/0464; G06N 3/08; G06N 3/082; G06N 3/084
    USPC ....... 382/100, 103, 104, 115, 128, 133, 134, 382/155–159, 173, 181, 224–228, 291, 382/325; 706/2, 12, 14–16, 20, 25–28, 706/39, 41–43, 59, 62
    See application file for complete search history.

(56) References Cited

U.S. PATENT DOCUMENTS

| | | | |
|---|---|---|---|
| 11,315,018 B2* | 4/2022 | Molchanov | G06N 3/082 |
| 11,423,311 B2* | 8/2022 | Brothers | G06N 3/082 |
| 2018/0336468 A1* | 11/2018 | Kadav | G06V 10/764 |

FOREIGN PATENT DOCUMENTS

| | | | |
|---|---|---|---|
| CN | 107766794 A | | 3/2018 |
| CN | 108596184 A | | 9/2018 |
| CN | 108876792 A | | 11/2018 |
| CN | 108876793 A | | 11/2018 |
| CN | 109191392 A | | 1/2019 |
| CN | 109886282 A | | 6/2019 |
| CN | 110110692 A | | 8/2019 |
| CN | 110223298 A | | 9/2019 |
| CN | 110232394 A | | 9/2019 |
| CN | 110837811 A | | 2/2020 |
| EP | 3410344 A1 | | 12/2018 |
| WO | WO 2017210690 A1 | | 12/2017 |

OTHER PUBLICATIONS

Tencent Technology, IPRP, PCT/CN2020/114372, May 17, 2022, 6 pgs.

Anbang Liu et al., "A Deep Fully Convolution Neural Network for Semantic Segmentation Based on Adaptive Feature Fusion", 2018 5th International Conference on Information Science and Control Engineering (ICISCE), Jan. 17, 2019, 5 pgs., Retrieved from the Internet: https://www.researchgate.net/publication/330469425_A_Deep_Fully_Convolution_Neural_Network_for_Semantic_Segmentation_Based_on_Adaptive_Feature_Fusion/link/5e4a72eca6fdccd965ac8832/download.

Jiang Feng et al., "Survey on Content-Based Image Segmentation Methods", Jan. 31, 2017, 24 pgs., Retrieved from the Internet: http://www.jos.org.cn/1000-9825/create_pdf aspx?file_no=5136.

Mingmin Zhen et al., "Learning Fully Dense Neural Networks for Image Semantic Segmentation", May 22, 2019, 3 pgs., Retrieved from the Internet: https://ojs.aaai.org/index.php/AAAI/article/view/4965.

Tencent Technology, ISR, PCT/CN2020/114372, Dec. 8, 2020, 2 pgs.

* cited by examiner

SEMANTIC SEGMENTATION NETWORK STRUCTURE GENERATION METHOD AND APPARATUS, DEVICE, AND STORAGE MEDIUM

CROSS-REFERENCE TO RELATED APPLICATIONS

This application is a continuation application of PCT Patent Application No. PCT/CN2020/114372, entitled "SEMANTIC SEGMENTATION NETWORK STRUCTURE GENERATION METHOD AND APPARATUS, DEVICE, AND STORAGE MEDIUM" filed on Sep. 10, 2020, which claims priority to Chinese Patent Application No. 201911102046.3, filed with the State Intellectual Property Office of the People's Republic of China on Nov. 12, 2019, and entitled "SEMANTIC SEGMENTATION NETWORK STRUCTURE GENERATION METHOD AND DEVICE, EQUIPMENT AND STORAGE MEDIUM", all of which are incorporated herein by reference in their entirety.

FIELD OF THE TECHNOLOGY

This application relates to the field of artificial intelligence technologies, and in particular, to semantic segmentation network structure generation method and apparatus, an electronic device, and a computer-readable storage medium.

BACKGROUND OF THE DISCLOSURE

The artificial intelligence (AI) is a comprehensive technology of computer science to study design principles and implementation methods of various intelligent machines, so that the machines have the functions of perception, reasoning, and decision-making. Artificial intelligence technology is a comprehensive discipline, involving a wide range of fields, such as natural language processing technology and machine learning/deep learning. With the development of technologies, the AI technology will be applied in more fields and play an increasingly important role.

Semantic segmentation is one of the important applications in the field of AI, which is widely used in autonomous driving, real-time video editing, face recognition system, intelligent hardware, or the like, that is, the semantic segmentation is the basic component of these complex systems.

However, a current semantic segmentation network structure is relatively simple and fixed, and through the fixed semantic segmentation network structure, it is impossible to recognize a content that is in an image and a corresponding position thereof in real time.

SUMMARY

Embodiments of this application provide semantic segmentation network structure generation method and apparatus, an electronic device, and a computer-readable storage medium, capable of dynamically adjusting the semantic segmentation network structure, thereby improving the performance of real-time segmentation.

Technical solutions of the embodiments of this application are implemented as follows:

An embodiment of this application provides a semantic segmentation network structure generation method, performed by an electronic device, the semantic segmentation network structure comprising a super cell and an aggregation cell, and the method comprising:
generating a corresponding architectural parameter for cells that form the super cell in the semantic segmentation network structure;
optimizing the semantic segmentation network structure based on image samples, and removing a redundant cell from a super cell to which a target cell pertains, to obtain an improved semantic segmentation network structure, the target cell being a cell having a maximum architectural parameter among the cells;
performing, by the aggregation cell in the improved semantic segmentation network structure, feature fusion on an output of the super cell from which the redundant cell is removed, to obtain a fused feature map;
performing recognition processing on the fused feature map, to determine positions corresponding to objects that are in the image samples; and
training the improved semantic segmentation network structure based on the positions corresponding to the objects that are in the image samples and annotations corresponding to the image samples, to obtain a trained semantic segmentation network structure.

An embodiment of this application provides an electronic device for generating a semantic segmentation network structure, including:
a memory, configured to store executable instructions; and
a processor, configured to perform the semantic segmentation network structure generation method provided by the embodiments of this application when executing the executable instructions stored in the memory.

An embodiment of this application provides a non-transitory computer-readable storage medium, storing executable instructions, the executable instructions, when executed by a processor of a computer device, implementing the semantic segmentation network structure generation method provided by the embodiments of this application or the image semantic segmentation method provided by the embodiments of this application.

The embodiments of this application have the following beneficial effects:

By removing a redundant cell from a super cell to which a target cell pertains, a redundant calculation cell is removed from the semantic segmentation network structure, the calculation amount of subsequent semantic segmentation is reduced, the semantic segmentation network structure is dynamically adjusted, and the depth of the semantic segmentation network structure is reduced, and by performing, by an aggregation cell, feature fusion on an output of the super cell from which the redundant cell is removed, outputs of the super cells having different resolutions can be fused adaptively, thereby improving the performance of real-time segmentation.

DESCRIPTION OF EMBODIMENTS

Figure 1:
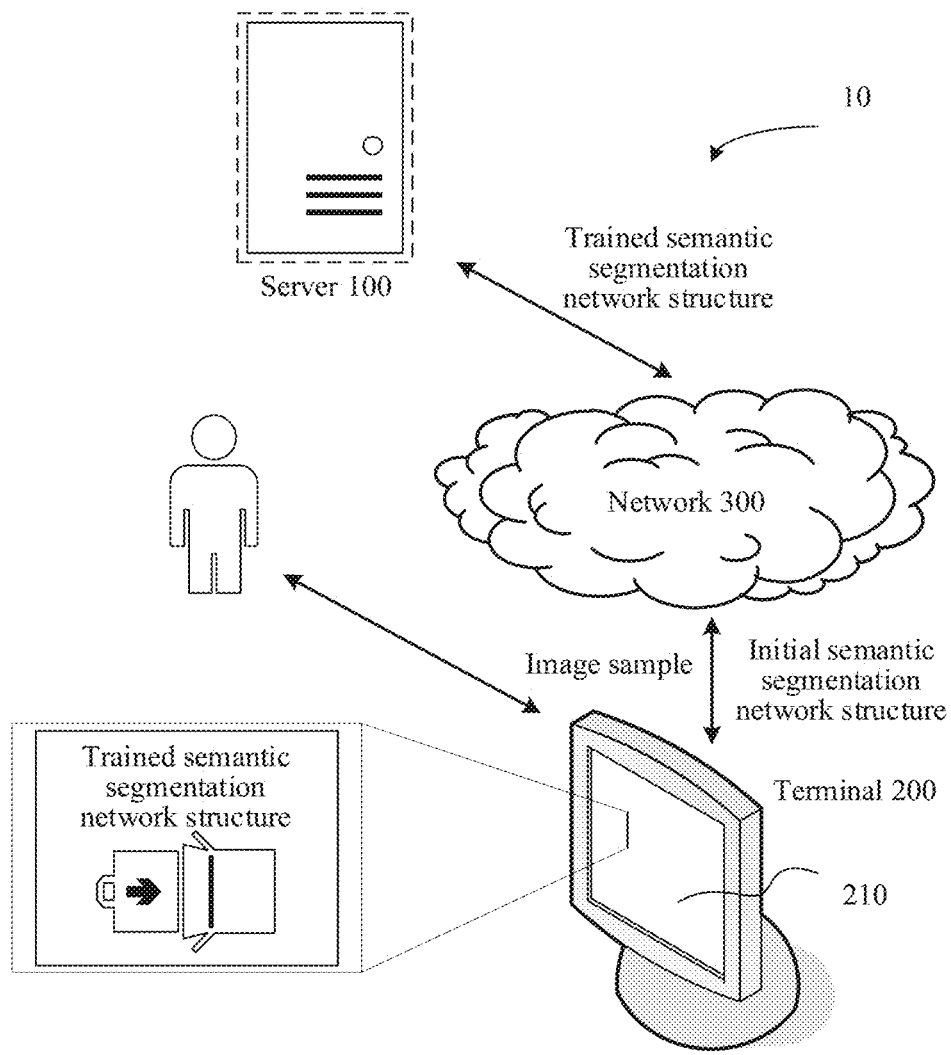
FIG. 1 is a schematic diagram of an application scenario of a semantic segmentation network structure generation system 10 according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

1) Image recognition: Image recognition is a technology of using a computer to process, analyze, and interpret images to identify targets and objects in different modes, and is a practical application of the deep learning algorithm. The image recognition technology is generally divided into face recognition and item recognition. The face recognition is mainly used in security inspection, identity verification, and mobile payment. The item recognition is mainly used in the process of item circulation, especially, in unmanned retail fields such as unmanned shelves and intelligent retail cabinets.

2) Target detection: Target detection is also referred to as target extraction, is a type of image segmentation based on geometric and statistical features of a target, and integrates target segmentation and recognition, of which the accuracy and real-time performance are an important capability of the whole system. Especially in a complex scene, when there are a plurality of targets to be processed in real time, automatic target extraction and recognition is particularly important. With the development of the computer technologies and the wide application of computer vision principle, the research of real-time target tracking using the computer image processing technology is becoming more and more popular. Dynamic real-time tracking and positioning of a target has a wide application value in an intelligent transportation system, an intelligent monitoring system, military target detection, and surgical instrument positioning in a medical navigation surgery.

3) Cell: A cell is composed of at least one node in a neural network. The cell in the embodiments of this application may be composed of two nodes (a first intermediate node and a second intermediate node). For example, output results of the $(k-1)^{th}$ cell and the $k^{th}$ cell are inputted to the first intermediate node in the $(k+1)^{th}$ cell and are processed by the first intermediate node, then an output result of the first intermediate node is inputted to the second intermediate node in the $(k+1)^{th}$ cell and is processed by the second intermediate node, and then an output result of the second intermediate node is inputted to the $(k+2)^{th}$ cell.

4) Super cell: A super cell is formed by cells in the same stage (resolution). For example, if the resolutions of the $(k-1)^{th}$ cell and the $k^{th}$ cell are both 128*128, and the resolutions of the (k+1)th cell and the $(k+2)^{th}$ cell are both 64*64, the $(k-1)^{th}$ cell and the $k^{th}$ cell form a super cell, and the $(k+1)^{th}$ cell and the $(k+2)^{th}$ cell form another super cell.

5) Semantic segmentation: Semantic segmentation refers to implementing fine-grained reasoning by performing dense prediction and label deduction for each pixel in an image, so that each pixel is labeled by a class of the pixel. That is, classes of all pixels in the image are looked up for, to identify a content that is in the image and a position thereof.

The semantic segmentation network structure described in the embodiments of this application can be applied to various recognition fields, such as an image recognition neural network, a target detection neural network, a face detection neural network, or an autonomous driving system. That is, the semantic segmentation network structure in the embodiments of this application is not limited to a specific recognition field.

In the related technology, the real-time semantic segmentation involves a manually designed network structure and a neural network search method.

The manually designed network structure (for example, a dense feature fusion solution, or a bidirectional network) requires constant error trials, trials of new structures, and retraining by a user. Although the network search method (for example, CAS) can deal with the repeated work, but the number of layers of the network cannot be dynamically adjusted, and the fusion of features in different stages is not considered either.

In conclusion, a person skilled in the art has not analyzed the semantic segmentation network structure, and the above-mentioned technical problems are not well known to a person skilled in the art. Therefore, it would be difficult for a person skilled in the art to find and propose the above-mentioned technical problems. However, in the embodiments of this application, the semantic segmentation network structure is analyzed, and thereby the above-mentioned technical problems are found.

To resolve at least the above-mentioned technical problems in the related technology, the embodiments of this application provide semantic segmentation network structure generation method and apparatus, an electronic device, and a computer-readable storage medium, capable of dynamically adjusting the semantic segmentation network structure, thereby improving the performance of real-time segmentation, decreasing the calculation complexity, reducing the calculation cost, and applying the trained semantic segmentation network structure to a subsequent semantic segmentation operation. An exemplary application of an electronic device for generating a semantic segmentation network structure provided by the embodiments of this application is described below. The electronic device for generating a semantic segmentation network structure provided by the embodiments of this application may be a server, such as a server deployed in the cloud, which according to an initial semantic segmentation network structure and image samples provided by another electronic device or user, performs a series of processing based on the initial semantic segmentation network structure and the image samples, to obtain a corresponding trained semantic segmentation network structure and provide the corresponding trained semantic segmentation network structure to a user for a subsequent semantic segmentation operation; or may be various types of user terminals such as a laptop, a tablet computer, a desktop computer, or a mobile device (for example, a mobile phone, or a personal digital assistant), for example, a handheld terminal, which obtains a corresponding trained semantic segmentation network structure based on an initial semantic segmentation network structure and image samples entered by a user on the handheld terminal, and provides the corresponding trained semantic segmentation network structure to the user for a subsequent semantic segmentation operation.

As an example, referring to FIG. 1, FIG. 1 is a schematic diagram of an application scenario of a semantic segmentation network structure generation system 10 according to an embodiment of this application. A terminal 200 is connected to a server 100 through a network 300. The network 300 may be a wide area network or a local area network, or a combination of the two.

In some embodiments, the terminal 200 locally executes the semantic segmentation network structure generation method provided by the embodiments of this application, to obtain a trained semantic segmentation network structure based on an initial semantic segmentation network structure and image samples entered by a user. For example, a semantic segmentation network structure generation assistant is installed on the terminal 200. The user enters the initial semantic segmentation network structure and the image samples in the semantic segmentation network structure generation assistant. The terminal 200 obtains the trained semantic segmentation network structure based on the inputted initial semantic segmentation network structure and image samples and displays the trained semantic segmentation network structure on a display interface 210 of the terminal 200, so that the user can perform applications such as image recognition and target detection by using the trained semantic segmentation network structure.

In some embodiments, the terminal 200 may alternatively send the initial semantic segmentation network structure and image samples entered by the user on the terminal 200 to the server 100 through the network 300 and invokes a semantic segmentation network structure generation function provided by the server 100. The server 100 obtains a trained semantic segmentation network structure by using the semantic segmentation network structure generation method provided by the embodiments of this application. For example, a semantic segmentation network structure generation assistant is installed on the terminal 200. The user enters the initial semantic segmentation network structure and the image samples in the semantic segmentation network structure generation assistant. The terminal 200 sends the initial semantic segmentation network structure and the image samples to the server 100 through the network 300. The server 100 receives the initial semantic segmentation network structure and the image samples to perform a series of processing to obtain the trained semantic segmentation network structure and returns the trained semantic segmentation network structure to the semantic segmentation network structure generation assistant, which then displays the trained semantic segmentation network structure on the display interface 210 of the terminal 200, or the server 100 directly provides the trained semantic segmentation network structure, so that the user can perform applications such as image recognition and target detection by using the trained semantic segmentation network structure.

In an implementation scenario, to obtain a semantic segmentation network structure for image recognition, the server or terminal may, according to an initial semantic segmentation network structure and image samples, optimize the initial semantic segmentation network structure based on the image samples, remove a redundant cell, determine objects that are in the image samples and positions corresponding to the objects by using an improved semantic segmentation network structure, and train the improved semantic segmentation network structure based on the objects that are in the image samples and the positions corresponding to the objects, to subsequently perform semantic segmentation on an image by using the trained semantic segmentation network structure, to determine a class to which the image pertains, for example, to perform semantic segmentation on the image by using the trained semantic segmentation network structure, to obtain a label (car, automobile, bus, or the like) corresponding to the image. By removing a redundant cell from a super cell to which a target cell pertains, a redundant calculation cell is removed from the semantic segmentation network structure, the calculation amount of subsequent semantic segmentation is reduced, and by performing, by an aggregation cell, feature fusion on an output of the super cell from which the redundant cell is removed, outputs of the super cells having different resolutions can be fused adaptively, thereby improving the performance of real-time image segmentation.

In an implementation scenario, to obtain a semantic segmentation network structure for target detection, the server or terminal may, according to an initial semantic segmentation network structure and target object samples, optimize the initial semantic segmentation network structure based on the target object samples, remove a redundant cell to obtain an improved semantic segmentation network structure, determine objects that are in the target object samples and positions corresponding to the objects by using the improved semantic segmentation network structure, and train the improved semantic segmentation network structure based on the objects that are in the target object samples and the positions corresponding to the objects, to subsequently perform semantic segmentation on a target object by using the trained semantic segmentation network structure, to determine a class to which the target object pertains, for example, to perform semantic segmentation on the target object by using the trained semantic segmentation network structure, to obtain a label (tree, pedestrian, vehicle, or the like) corresponding to the target object, so as to detect a pedestrian. By removing a redundant cell from a super cell to which a target cell pertains, a redundant calculation cell is removed from the semantic segmentation network structure, the calculation amount of subsequent semantic segmentation is reduced, and by performing, by an aggregation cell, feature fusion on an output of the super cell from which the redundant cell is removed, outputs of the super cells having different resolutions can be fused adaptively, thereby improving the performance of real-time target object segmentation.

In an implementation scenario, to obtain a semantic segmentation network structure for face recognition, the server or terminal may, according to an initial semantic segmentation network structure and face samples, optimize the initial semantic segmentation network structure based on the face samples, remove a redundant cell, determine objects that are in the face samples and positions corresponding to the objects by using the improved semantic segmentation network structure, and train the improved semantic segmentation network structure based on the objects that are in the face samples and the positions corresponding to the objects, to subsequently perform semantic segmentation on a face by using the trained semantic segmentation network structure, to determine a class to which the face pertains, thereby implementing face recognition, for example, to perform semantic segmentation on the face by using the trained semantic segmentation network structure, to obtain a label (Xiaoming, Xiaohong, Xiaoqiang, or the like) corresponding to the face. By removing a redundant cell from a super cell to which a target cell pertains, a redundant calculation cell is removed from the semantic segmentation network structure, the calculation amount of subsequent semantic segmentation is reduced, and by performing, by an aggregation cell, feature fusion on an output of the super cell from which the redundant cell is removed, outputs of the super cells having different resolutions can be fused adaptively, thereby improving the performance of real-time face segmentation.

In an implementation scenario, to obtain a semantic segmentation network structure for autonomous driving, the server or terminal may, according to an initial semantic segmentation network structure and travel road condition samples, optimize the initial semantic segmentation network structure based on the travel road condition samples, remove a redundant cell, determine objects that are in the travel road condition samples and positions corresponding to the objects by using the aggregation cell in the improved semantic segmentation network structure, and train the improved semantic segmentation network structure based on the objects that are in the travel road condition samples and the positions corresponding to the objects, to subsequently perform semantic segmentation on a road condition by using the trained semantic segmentation network structure, to determine a driving class to which the road condition pertains, thereby implementing autonomous driving based on the road condition, for example, to perform semantic segmentation on the road condition by using the trained semantic segmentation network structure, to obtain a label (turn left, turn right, go straight, or the like) corresponding to the road condition. By removing a redundant cell from a super cell to which a target cell pertains, a redundant calculation cell is removed from the semantic segmentation network structure, the calculation amount of subsequent semantic segmentation is reduced, and by performing, by an aggregation cell, feature fusion on an output of the super cell from which the redundant cell is removed, outputs of the super cells having different resolutions can be fused adaptively, thereby improving the performance of real-time road condition segmentation.

In an implementation scenario, to obtain a semantic segmentation network structure for video editing, the server or terminal may, according to an initial semantic segmentation network structure and video editing samples, optimize the initial semantic segmentation network structure based on the video editing samples, remove a redundant cell to obtain an improved semantic segmentation network structure, determine objects that are in the video editing samples and positions corresponding to the objects by using the improved semantic segmentation network structure, and train the improved semantic segmentation network structure based on the objects that are in the video editing samples and the positions corresponding to the objects, to subsequently perform semantic segmentation on a video by using the trained semantic segmentation network structure, to determine an editing class to which the video pertains, thereby implementing automatic real-time editing based on the video, for example, to perform semantic segmentation on the video by using the trained semantic segmentation network structure, to obtain a label (cut, reduce, enlarge, or the like) corresponding to the video. By removing a redundant cell from a super cell to which a target cell pertains, a redundant calculation cell is removed from the semantic segmentation network structure, the calculation amount of subsequent semantic segmentation is reduced, and by performing, by an aggregation cell, feature fusion on an output of the super cell from which the redundant cell is removed, outputs of the super cells having different resolutions can be fused adaptively, thereby improving the performance of real-time video segmentation.

The following continuously describes the structure of the electronic device for generating a semantic segmentation network structure provided by the embodiments of this application. The electronic device for generating a semantic segmentation network structure may be various terminals, such as a mobile phone or a computer, or may alternatively be the server 100 shown in FIG. 1.

Figure 2:
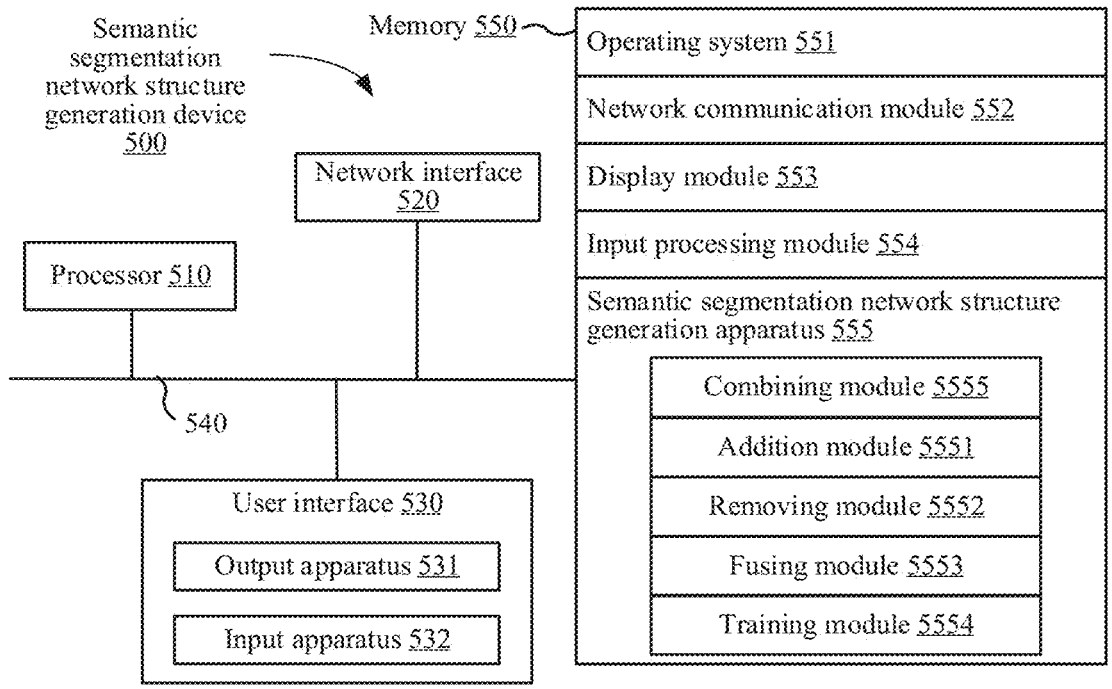
FIG. 2 is a schematic structural diagram of an electronic device 500 for generating a semantic segmentation network structure according to an embodiment of this application.

Referring to FIG. 2, FIG. 2 is a schematic structural diagram of an electronic device 500 for generating a semantic segmentation network structure according to an embodiment of this application. The electronic device 500 for generating a semantic segmentation network structure shown in FIG. 2 includes: at least one processor 510, a memory 550, at least one network interface 520, and a user interface 530. All the components in the electronic device 500 for generating a semantic segmentation network structure are coupled together by using a bus system 540. It may be understood that the bus system 540 is configured to implement connection and communication between these components. In addition to a data bus, the bus system 540 further includes a power bus, a control bus, and a status signal bus. However, for ease of clear description, all types of buses are marked as the bus system 540 in FIG. 2.

The processor 510 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The user interface 530 includes one or more output apparatuses 531 capable of presenting media content, including one or more speakers and/or one or more visualization displays. The user interface 530 further includes one or more input apparatuses 532, including user interface components that facilitate inputting by a user, such as a keyboard, a mouse, a microphone, a touch display screen, a camera, and other input buttons and controls.

The memory 550 may be a volatile memory or a non-volatile memory, or may include a volatile memory and a non-volatile memory. The non-volatile memory may be a read-only memory (ROM), and the volatile memory may be a random-access memory (RAM). The memory 550 described in the embodiments of this application is to include any other suitable type of memories. The memory 550 includes one or more storage devices that are physically located away from the processor 510.

In some embodiments, the memory 550 may store data to support operations, and examples of the data include programs, modules, and data structures, or a subset or a superset thereof, which are illustrated below.

An operating system 551 includes a system program used for processing various basic system services and performing a hardware-related task, for example, a framework layer, a core library layer, and a driver layer, and is used for implementing various basic services and processing a hardware-related task.

The network communication module 552 is configured to reach another computing device through one or more (wired or wireless) network interfaces 520. Exemplary network interfaces 520 include: Bluetooth, wireless compatible authentication (WiFi), a universal serial bus (USB), and the like.

A display module 553 is configured to display information by using an output apparatus 531 (for example, a display screen or a speaker) associated with one or more user interfaces 530 (for example, a user interface configured to operate a peripheral device and display content and information).

An input processing module 554 is configured to detect one or more user inputs or interactions from one of the one or more input apparatuses 532 and translate the detected input or interaction.

In some embodiments, the semantic segmentation network structure generation apparatus provided in the embodiments of this application may be implemented by combining hardware and software. For example, the semantic segmentation network structure generation apparatus provided in the embodiments of this application may be a processor in a form of a hardware decoding processor, programmed to perform the semantic segmentation network structure generation method provided in the embodiments of this application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

In other embodiments, the semantic segmentation network structure generation apparatus provided by the embodiments of this application can be implemented in a software mode. FIG. 2 shows a semantic segmentation network structure generation apparatus 555 stored in the memory 550, which may be software in the form of programs and plug-ins, and includes a series of modules, including an addition module 5551, a removing module 5552, a fusing module 5553, a training module 5554, and a combining module 5555. The addition module 5551, the removing module 5552, the fusing module 5553, the training module 5554, and the combining module 5555 are configured to implement the semantic segmentation network structure generation method provided by the embodiments of this application.

It is to be understood from the foregoing that the semantic segmentation network structure generation method provided by the embodiments of this application may be implemented by various types of electronic devices for generating a semantic segmentation network structure, such as an intelligent terminal, a server, or the like.

Figure 3:
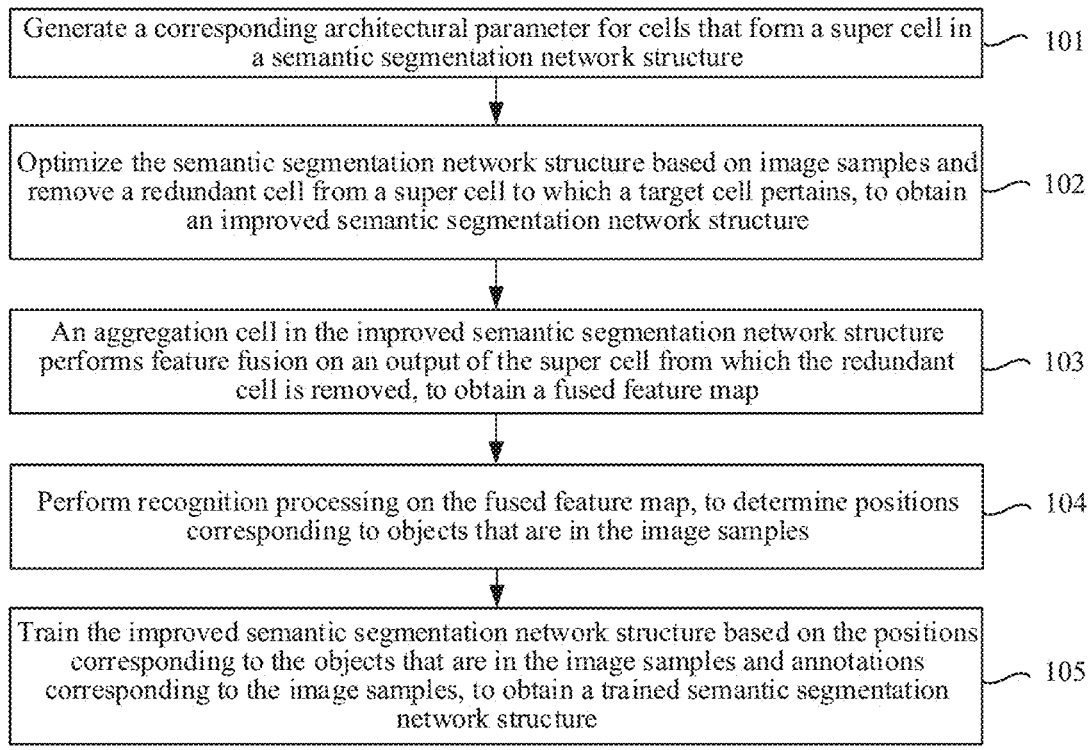
FIG. 3 to FIG. 6 are schematic flowcharts of semantic segmentation network structure generation methods according to embodiments of this application.

The semantic segmentation network structure generation method provided by the embodiments of this application is described below in combination with the exemplary application and implementation of the server provided by the embodiments of this application. Referring to FIG. 3, FIG. 3 is a schematic flowchart of a semantic segmentation network structure generation method according to an embodiment of this application. Description is provided below by combining the steps shown in FIG. 3.

In the following steps, a super cell is composed of cells in the same stage (resolution). For example, if the resolutions of the $(k-1)^{th}$ cell and the $k^{th}$ cell are both 128*128, the $(k-1)^{th}$ cell and the $kt^h$ cell form a super cell. The aggregation cell is configured to perform feature fusion, to adaptively fuse features in different sizes.

Step 101. Generate a corresponding architectural parameter for cells that form a super cell in a semantic segmentation network structure.

As an example of obtaining the semantic segmentation network structure, a user enters an initial semantic segmentation network structure and image samples in a client (running in a terminal), the terminal automatically obtains a generation request for the semantic segmentation network structure (including the initial semantic segmentation network structure) and sends the generation request for the semantic segmentation network structure to a server, and the server receives the generation request for the semantic segmentation network structure and extracts the semantic segmentation network structure. Then, to further remove a redundant cell from the super cell subsequently, a corresponding architectural parameter may be first added to the cells that form the super cell in the semantic segmentation network structure.

Figure 4:
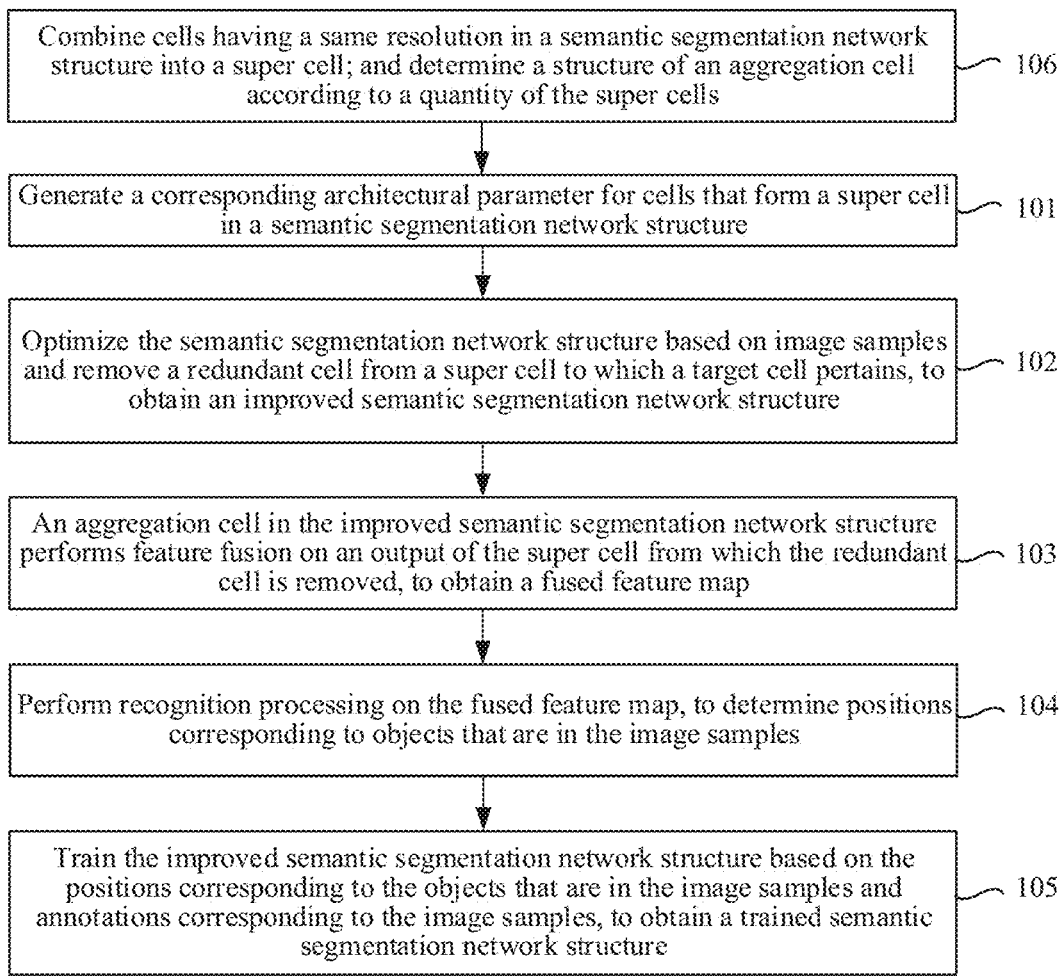

Referring to FIG. 4, FIG. 4 is a schematic diagram of a procedure according to an embodiment of this application. In some embodiments, before step 101 shown in FIG. 3, the method further includes step 106, as shown in FIG. 4.

Step 106. Combine cells having a same resolution in a semantic segmentation network structure into a super cell; and determine a structure of an aggregation cell according to a quantity of the super cells.

Before generating the corresponding architectural parameter, the semantic segmentation network structure needs to be initialized, that is, to construct a super cell in the semantic segmentation network structure. The super cell is formed by cells having a same resolution in the semantic segmentation network structure. After the cells having the same resolution are combined into a super cell, a quantity of the super cells is determined, and according to the quantity of the super cells, a structure of an aggregation cell in the semantic segmentation network structure is determined, so that the aggregation cell subsequently performs a reduction operation.

In some embodiments, determining the structure of the aggregation cell according to the quantity of the super cells includes: determining the quantity N of the super cells; and determining a quantity of reduction cells in the aggregation cell and corresponding to an $i^{th}$ super cell to be N−i, where N is a positive integer greater than or equal to 2, i is a positive integer, and i is less than or equal to N.

After determining the quantity N of the super cells, quantities of reduction cells in the aggregation cell and corresponding to the N super cells are sequentially determined according to a sequence of the super cells. For example, when the quantity of the super cells is determined to be 3, it is determined that, in the aggregation cell, the quantity of reduction cells corresponding to the $1^{st}$ super cell is 2, the quantity of reduction cells corresponding to the $2^{nd}$ super cell is 1, and the quantity of reduction cells corresponding to the $3^{rd}$ super cell is 0. When the quantity of super cells is determined to be 4, it is determined that, in the aggregation cell, the quantity of reduction cells corresponding to the $1^{st}$ super cell is 3, the quantity of reduction cells corresponding to the $2^{nd}$ super cell is 2, the quantity of reduction cells corresponding to the $3^{rd}$ super cell is 1, and the quantity of reduction cells corresponding to the $4^{th}$ super cell is 0. According to the empirical value, the quantity of the super cells is generally 3 or 4

In some embodiments, adding a corresponding architectural parameter to the cells that form the super cell in the semantic segmentation network structure includes: determining a quantity M of the cells that form the super cell in the semantic segmentation network structure; and generating the corresponding architectural parameter with a value of 1/M for the cells that form the super cell in the semantic segmentation network structure.

After the semantic segmentation network structure is initialized, a corresponding initial architectural parameter needs to be added for the cells that form the super cell in the semantic segmentation network structure. The initial architectural parameter is determined according to the quantity of cells that form the super cell. Therefore, after the quantity M of the cells that form the super cell in the semantic segmentation network structure is determined, the corresponding architectural parameter with a value of 1/M may be generated for the cells that form the super cell in the semantic segmentation network structure. For example, if the quantity of the cells that form the super cell in the semantic segmentation network structure is determined to be 10, the corresponding initial architectural parameter generated for the cells that form the super cell in the semantic segmentation network structure is 0.1.

Step 102. Optimize the semantic segmentation network structure based on image samples and remove a redundant cell from a super cell to which a target cell pertains, to obtain an improved semantic segmentation network structure.

The target cell is a cell having a maximum architectural parameter among the cells. To determine a maximum value of the architectural parameter, it is necessary to optimize the semantic segmentation network structure based on the image samples and remove a redundant cell from the super cell to which the target cell corresponding to the maximum value of the architectural parameter after optimization pertains, so that the semantic segmentation network structure is dynamically adjusted and the depth of the semantic segmentation network structure is reduced.

In some embodiments, optimizing the semantic segmentation network structure based on the image samples include: performing joint training on a parameter of the semantic segmentation network structure, and an operating parameter and the architectural parameter of the cells based on the image samples, determining a maximum architectural parameter obtained after the training, and determining a cell corresponding to the maximum architectural parameter as the target cell.

To determine the maximum value of the architectural parameter, coarse training can be performed on the semantic segmentation network structure based on the image samples, as along as the maximum value of the architectural parameter can be determined. The coarse training process includes performing joint training on a parameter of the semantic segmentation network structure, and an operating parameter and the architectural parameter of the cells based on the image samples, determining a maximum architectural parameter obtained after the training, and determining a cell corresponding to the maximum architectural parameter as the target cell. The operating parameters of the cells may involve an operation of pooling, convolution, identical mapping, or the like.

In some embodiments, determining a maximum architectural parameter obtained after the training and determining a cell corresponding to the maximum architectural parameter as the target cell includes: determining a cell corresponding to the architectural parameter being 1 that is obtained after the training as the target cell.

In the coarse training process, when the architectural parameter of a cell is 1, the cell corresponding to the architectural parameter being 1 is determined as the target cell, so that a redundant cell is subsequently removed from the super cell. For example, if the initial architectural parameter of the cells is 0.1 and after coarse training, the architectural parameter of the $4^{th}$ cell is altered to be 1, the $4^{th}$ cell is determined as the target cell.

In some embodiments, removing a redundant cell from a super cell to which the target cell corresponding to the maximum value of the architectural parameter pertains, to obtain an improved semantic segmentation network structure includes: determining an order j of the target cell in the super cell to which the target cell pertains, and removing a redundant cell after the order j from the super cell; and constructing an improved semantic segmentation network structure by using the super cell from which the redundant cell is removed and the aggregation cell.

After the target cell is determined, the order of the target cell in the super cell to which the target cell pertains may be determined, and a redundant cell after the order is removed from the super cell, so as to construct an improved semantic segmentation network structure by using the super cell from which the redundant cell is removed and the aggregation cell, so that there is no redundant cell in the improved semantic segmentation network structure, the semantic segmentation network structure is dynamically adjusted, and the depth of the semantic segmentation network structure is reduced. For example, if the $1^{st}$ super cell includes 10 cells and the architectural parameter of the $4^{th}$ cell is altered to be 1, redundant cells after the $4^{th}$ cell are removed from the $1^{st}$ super cell, that is, the $5^{th}$ cell to the $10^{th}$ cell are removed from the $1^{st}$ super cell. The $1^{st}$ super cell from which the redundant cells are removed include only the $1^{st}$ cell to the $4^{th}$ cell. In the coarse training process, an output of the super cell is a weighted sum of outputs of the cells in the super cell and architectural parameter of the cells. For example, $f(x^k)$ represents a feature outputted by the $k^{th}$ cell in the super cell, $\beta_k$ represents the architectural parameter of the $k^{th}$ cell, n represents a quantity of the cells, and the output of the super cell is $\Sigma_{k=1}^{n} f(x^k) * \beta_k$.

Step 103. An aggregation cell in the improved semantic segmentation network structure performs feature fusion on an output of the super cell from which the redundant cell is removed, to obtain a fused feature map.

After the improved semantic segmentation network structure is determined, the aggregation cell in the semantic segmentation network structure may be used to perform feature fusion on the output of the super cell from which the redundant cells are removed, to obtain a fused feature map, so as to perform fine training on the improved semantic segmentation network structure based on the fused feature map, thereby obtaining a trained semantic segmentation network structure, for subsequently performing semantic segmentation on an image.

Figure 5:
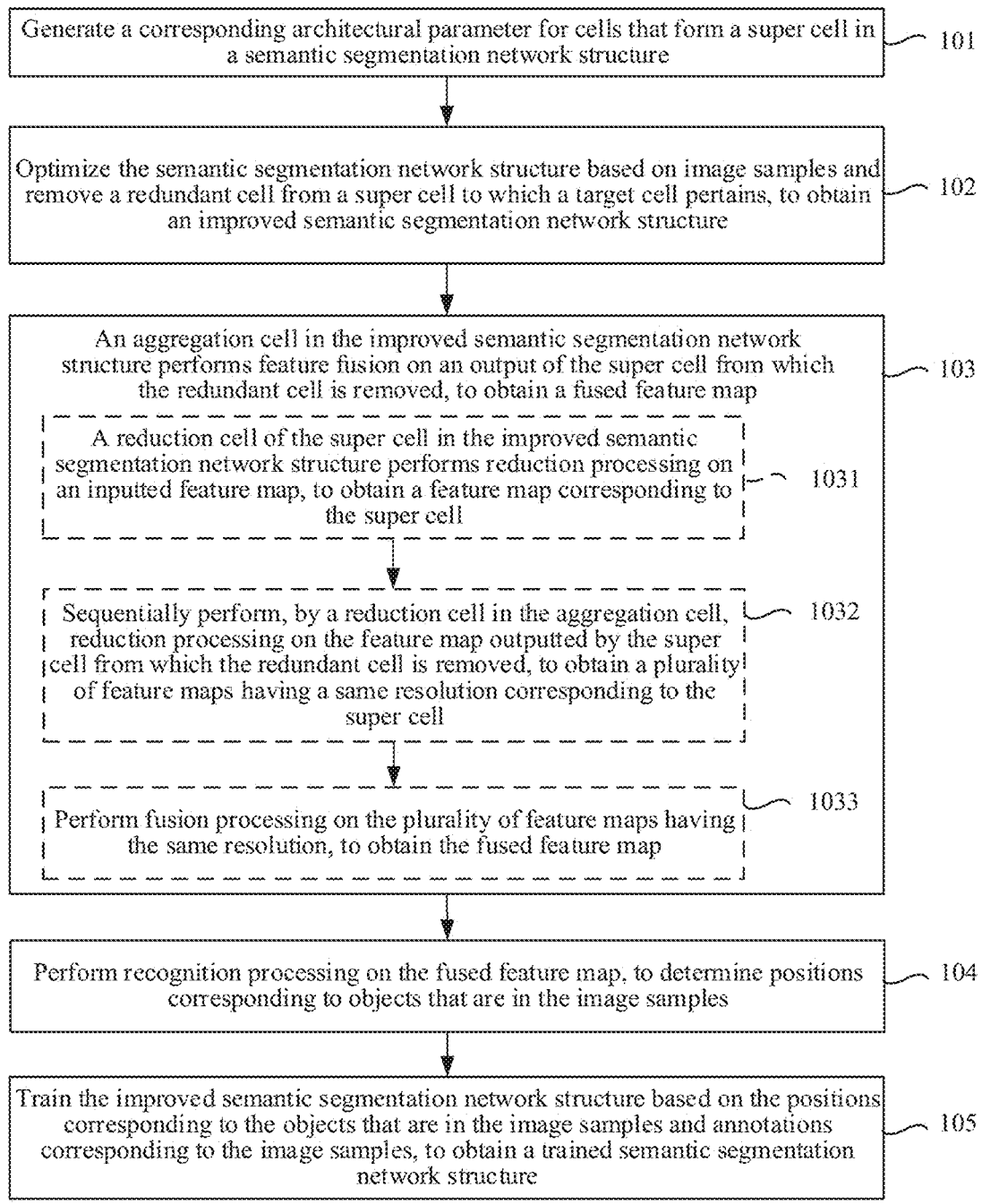

Referring to FIG. 5, FIG. 5 is a schematic diagram of a procedure according to an embodiment of this application. In some embodiments, FIG. 5 illustrates that step 103 shown in FIG. 3 may be implemented by step 1031 to step 1033 shown in FIG. 5.

Step 1031. A reduction cell of the super cell in the improved semantic segmentation network structure performs reduction processing on an inputted feature map, to obtain a feature map corresponding to the super cell.

During the coarse training, after a maximum value of the architectural parameter of the cells is determined and a redundant cell is removed from a super cell to which the target cell corresponding to the maximum value of the architectural parameter pertains, to obtain an improved semantic segmentation network structure, a reduction cell of the super cell in the improved semantic segmentation network structure may be used to perform reduction processing on an inputted feature map, to obtain a feature map corresponding to the super cell.

The super cell includes a reduction cell and a normal cell. The reduction cell has a stride of 2, thereby implementing a reduction function, and the normal cell has a stride of 1 and cannot implement the reduction function. When the improved semantic segmentation network structure is determined, an image is inputted to the improved semantic segmentation network structure, first goes through a layer of convolutional neural network with a reduction being 2, and then sequentially passes through three successive super cells, where the $1^{st}$ cell of each super cell is a reduction cell, and the rest cells are normal cells. The reduction cell of each super cell performs reduction processing on an inputted feature map, to obtain a feature map corresponding to the super cell and inputs the feature map to the next super cell or the aggregation cell.

In some embodiments, performing, by the reduction cell of the super cell in the improved semantic segmentation network structure, reduction processing on an inputted feature map, to obtain a feature map corresponding to the super cell includes: determining an $i^{th}$ super cell in the improved semantic segmentation network structure and from which a redundant cell is removed; and performing, by the $i^{th}$ super cell, reduction processing on the inputted feature map, to obtain the feature map corresponding to the $i^{th}$ super cell.

To perform reduction processing on an inputted feature map by using the reduction cell of the super cell in the improved semantic segmentation network structure, first an $i^{th}$ super cell in the improved semantic segmentation network structure and from which a redundant cell is removed may be determined and then the $i^{th}$ super cell performs reduction processing on the inputted feature map, to obtain the feature map corresponding to the $i^{th}$ super cell, and inputs the feature map to the next super cell or the aggregation cell. For example, in a case in which the improved semantic segmentation network structure has three super cells, when it is determined that the super cell in the improved semantic segmentation network structure and from which a redundant cell is removed is the $1^{st}$ super cell, the $1^{st}$ super cell performs reduction processing on an inputted feature map to obtain a feature map corresponding to the $1^{st}$ super cell, and inputs the feature map corresponding to the $1^{st}$ super cell to the $2^{nd}$ super cell and the aggregation cell; when it is determined that the super cell in the improved semantic segmentation network structure and from which a redundant cell is removed is the $2^{nd}$ super cell, the $2^{nd}$ super cell performs reduction processing on an inputted feature map corresponding to the $1^{st}$ super cell to obtain a feature map corresponding to the $2^{nd}$ super cell, and inputs the feature map corresponding to the $2^{nd}$ super cell to the $3^{rd}$ super cell and the aggregation cell; when it is determined that the super cell in the improved semantic segmentation network structure and from which a redundant cell is removed is the $3^{rd}$ super cell, the $3^{rd}$ super cell performs reduction processing on an inputted feature map corresponding to the $2^{nd}$ super cell to obtain a feature map corresponding to the $3^{rd}$ super cell, and inputs the feature map corresponding to the $3^{rd}$ super cell to the aggregation cell.

Step 1032. Sequentially perform, by a reduction cell in the aggregation cell, reduction processing on the feature map outputted by the super cell from which the redundant cell is removed, to obtain a plurality of feature maps having a same resolution corresponding to the super cell.

After the reduction processing is performed on the inputted feature map by a reduction cell of the super cell, further reduction processing may be sequentially performed, by a reduction cell in the aggregation cell, on the feature map outputted by the super cell from which the redundant cell is removed, to obtain feature maps having a same resolution corresponding to the super cell, for subsequent fusion processing on the feature maps having the same resolution.

In some embodiments, sequentially performing, by a reduction cell in the aggregation cell, reduction processing on the feature map outputted by the super cell from which the redundant cell is removed, to obtain a plurality of feature maps having a same resolution corresponding to the super cell includes: performing, by N–i reduction cells in the aggregation cell, reduction processing on the $i^{th}$ super cell for N–i times, to obtain reduction feature maps corresponding to the $i^{th}$ super cell.

The reduction feature maps of the N super cells have a same resolution. To enable the reduction feature maps of the N super cells to have the same resolution, reduction processing may be performed on the super cells by reduction cells in the aggregation cell, to obtain the reduction feature maps corresponding to the super cells, that is, reduction processing is performed, by N–i reduction cells in the aggregation cell, on the $i^{th}$ super cell for N–i times, to obtain reduction feature maps corresponding to the $i^{th}$ super cell. For example, when the improved semantic segmentation network structure has there super cells, reduction processing is performed by the $2^{nd}$ reduction cell in the aggregation cell twice on the feature map outputted by the $1^{st}$ super cell, to obtain reduction feature maps corresponding to the $1^{st}$ super cell; reduction processing is performed by the $1^{st}$ reduction cell in the aggregation cell once on the feature map outputted by the $2^{nd}$ super cell, to obtain a reduction feature map corresponding to the $2^{nd}$ super cell; and no reduction processing is performed on the feature map outputted by the $3^{rd}$ super cell, and other operations apart from the reduction may be performed by a normal cell in the aggregation cell on the $3^{rd}$ super cell, to obtain a normal feature map corresponding to the $3^{rd}$ super cell. Finally, the reduction feature maps corresponding to the $1^{st}$ super cell, the reduction feature map corresponding to the $2^{nd}$ super cell, and the normal feature map corresponding to the $3^{rd}$ super cell are inputted to a normal cell in the aggregation cell to further perform other operations apart from the reduction again, for subsequent fusion processing.

Step 1033: Perform fusion processing on the plurality of feature maps having the same resolution, to obtain the fused feature map.

After obtaining the feature maps having the same resolution, the fusion processing may be performed on the plurality of feature maps having the same resolution, to obtain the fused feature map, for subsequent semantic segmentation processing. The fusion processing may be splicing processing, that is, the reduction feature maps corresponding to the super cells are spliced sequentially, to obtain the fused feature map. Through the feature fusion, outputs of super cells having different resolutions may be adaptively fused, thereby improving the performance of real-time segmentation and being suitable for various semantic segmentation application scenarios.

Step 104. Perform recognition processing on the fused feature map, to determine positions corresponding to objects that are in the image samples.

After obtaining the fused feature map, to perform fine training on the improved semantic segmentation network structure, the recognition processing may be performed on the fused feature map, to determine objects that are in the image samples and positions corresponding to the objects, for subsequently training the improved semantic segmentation network structure based on the objects that are in the image samples and the positions corresponding to the objects.

Figure 6:
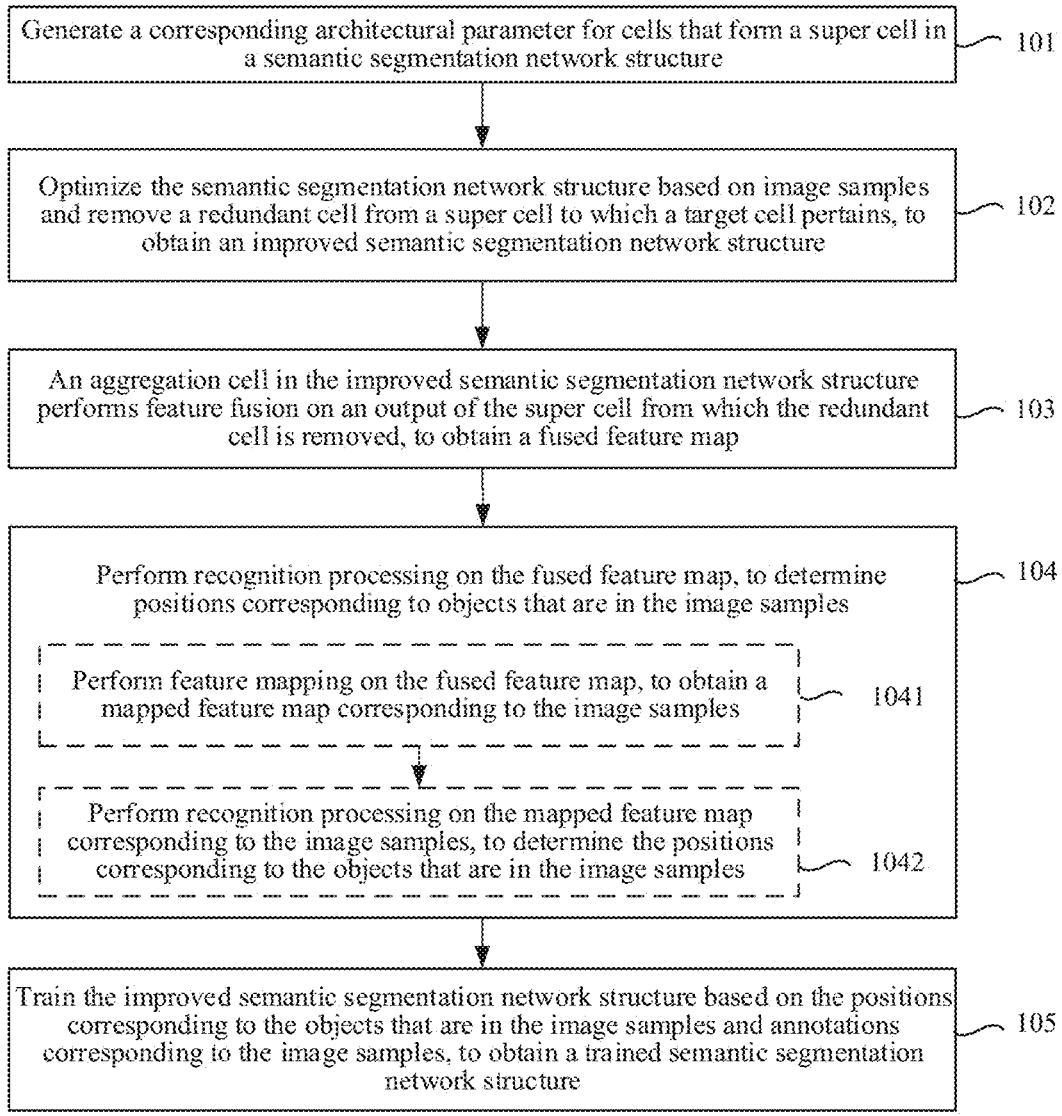

Referring to FIG. 6, FIG. 6 is a schematic diagram of a procedure according to an embodiment of this application. In some embodiments, FIG. 6 illustrates that step 104 shown in FIG. 3 may be implemented by step 1041 and step 1042 shown in FIG. 6.

Step 1041. Perform feature mapping on the fused feature map, to obtain a mapped feature map corresponding to the image samples.

The fused feature map is a low-resolution feature map, and therefore feature mapping needs to be performed on the low-resolution feature map, to map the low-resolution feature map to a pixel-level feature map. A feature map with dense features can be generated by upsampling. Therefore, the feature mapping may be performed on the fused feature map, to obtain a mapped feature map corresponding to the image samples, for subsequent recognition processing.

Step 1042. Perform recognition processing on the mapped feature map corresponding to the image samples, to determine the positions corresponding to the objects that are in the image samples.

After obtaining the mapped feature map corresponding to the image samples, recognition processing is performed on the mapped feature map corresponding to the image samples by using the semantic segmentation method, to determine the objects that are in the image samples and the positions corresponding to the objects, for subsequently training the improved semantic segmentation network structure based on the objects that are in the image samples and the positions corresponding to the objects.

Step 105. Train the improved semantic segmentation network structure based on the positions corresponding to the objects that are in the image samples and annotations corresponding to the image samples, to obtain a trained semantic segmentation network structure.

After obtaining the objects that are in the image samples and the positions corresponding to the objects, annotations corresponding to the image samples may be obtained. The annotations corresponding to the image samples are objects in the image samples and positions corresponding to the objects that are manually pre-annotated by a user. After obtaining the objects that are in the image samples and the positions corresponding to the objects and the annotations corresponding to the image samples, iterative training may be performed on the improved semantic segmentation network structure based on the objects that are in the image samples and the positions corresponding to the objects and the annotations corresponding to the image samples, to generate a trained semantic segmentation network structure, for subsequently performing semantic segmentation on another image by using the trained semantic segmentation network structure.

In some embodiments, training the improved semantic segmentation network structure based on the objects that are in the image samples and the positions corresponding to the objects and the annotations corresponding to the image samples includes: constructing a loss function of the improved semantic segmentation network structure based on the positions corresponding to the objects that are in the image samples and the annotations corresponding to the image samples; and updating a parameter of the improved semantic segmentation network structure until the loss function converges.

After the server constructs a value of the loss function of the improved semantic segmentation network structure based on the positions corresponding to the objects that are in the image samples and the annotations corresponding to the image samples, whether the value of the loss function exceeds a preset threshold may be determined. When the value of the loss function exceeds the preset threshold, error information of the improved semantic segmentation network structure is determined based on the loss function, and the error information is back-propagated in the improved semantic segmentation network structure. In addition, model parameters of the layers are updated in the propagation process.

The back-propagation is described herein. Training sample data is inputted to an input layer of a neural network model, passes through a hidden layer, and finally reaches an output layer, and a result is outputted, which is a forward propagation process of the neural network model. Because there is an error between an output result of the neural network model and an actual result, an error between the output result and an actual value is calculated, and the error is back-propagated from the output layer to the hidden layer until it is propagated to the input layer. In the back-propagation process, the value of the model parameter is adjusted according to the error. The above process is iterated continuously until convergence, in which the semantic segmentation network structure is a neural network model.

The semantic segmentation network structure generation method provided by the embodiments of this application has been described in combination with the exemplary application and implementation of the server provided by the embodiments of this application. The following continuously describes the solution in which modules of a semantic segmentation network structure generation apparatus 555 provided by the embodiments of this application collaborate to implement generation of the semantic segmentation network structure.

An addition module 5551 is configured to generate a corresponding architectural parameter for cells that form a super cell in a semantic segmentation network structure. A removing module 5552 is configured to optimize the semantic segmentation network structure based on image samples, and remove a redundant cell from a super cell to which a target cell corresponding to a maximum value of the architectural parameter pertains, to obtain an improved semantic segmentation network structure. A fusing module 5553 is configured to perform, by using an aggregation cell in the improved semantic segmentation network structure, feature fusion on an output of the super cell from which the redundant cell is removed, to obtain a fused feature map. A training module 5554 is configured to perform recognition processing on the fused feature map, to determine positions corresponding to objects that are in the image samples, and train the improved semantic segmentation network structure based on the positions corresponding to the objects that are in the image samples and annotations corresponding to the image samples, to obtain a trained semantic segmentation network structure.

In some embodiments, the semantic segmentation network structure generation apparatus 555 further includes: a combining module 5555, configured to combine cells having a same resolution in the semantic segmentation network structure into the super cell; and determine a structure of the aggregation cell according to a quantity of the super cells.

In some embodiments, the combining module 5555 is further configured to determine the quantity N of the super cells; and determine a quantity of reduction cells in the aggregation cell and corresponding to an $i^{th}$ super cell to be N−i, where N is a positive integer greater than or equal to 2, i is a positive integer, and i is less than or equal to N.

In some embodiments, the addition module 5551 is further configured to determine a quantity M of the cells that form the super cell in the semantic segmentation network structure; and generate the corresponding architectural parameter with a value of 1/M for the cells that form the super cell in the semantic segmentation network structure.

In some embodiments, the removing module 5552 is further configured to perform joint training on a parameter of the semantic segmentation network structure, and an operating parameter and the architectural parameter of the cells based on the image samples, determine a maximum architectural parameter obtained after the training, and determine a cell corresponding to the maximum architectural parameter as the target cell.

In some embodiments, the removing module 5552 is further configured to determine a cell corresponding to the architectural parameter being 1 that is obtained after the training as the target cell.

In some embodiments, the removing module 5552 is further configured to determine an order j of the target cell in the super cell to which the target cell pertains, and remove a redundant cell after the order j from the super cell; and construct an improved semantic segmentation network structure by using the super cell from which the redundant cell is removed and the aggregation cell.

In some embodiments, the fusing module 5553 is further configured to perform, by a reduction cell of the super cell in the improved semantic segmentation network structure, reduction processing on an inputted feature map, to obtain a feature map corresponding to the super cell; sequentially perform, by a reduction cell in the aggregation cell, reduction processing on the feature map outputted by the super cell from which the redundant cell is removed, to obtain a plurality of feature maps having a same resolution corresponding to the super cell; and perform fusion processing on the plurality of feature maps having the same resolution, to obtain the fused feature map.

In some embodiments, The fusing module 5553 is further configured to determine the $i^{th}$ super cell in the improved semantic segmentation network structure and from which the redundant cell is removed; perform reduction processing on the feature map inputted by the $i^{th}$ super cell, to obtain a feature map corresponding to the super cell; and perform, by using N−i reduction cells in the aggregation cell, reduction processing on the $i^{th}$ super cell for N−i times, to obtain reduction feature maps corresponding to the $i^{th}$ super cell, where the reduction feature maps corresponding to the N super cells have a same resolution.

In some embodiments, The training module 5554 is further configured to perform feature mapping on the fused feature map, to obtain a mapped feature map corresponding to the image samples; perform recognition processing on the mapped feature map corresponding to the image samples, to determine objects that are in the image samples and positions corresponding to the objects; construct a loss function of the improved semantic segmentation network structure based on the positions corresponding to the objects that are in the image samples and the annotations corresponding to the image samples; and update a parameter of the improved semantic segmentation network structure until the loss function converges.

Figure 7:
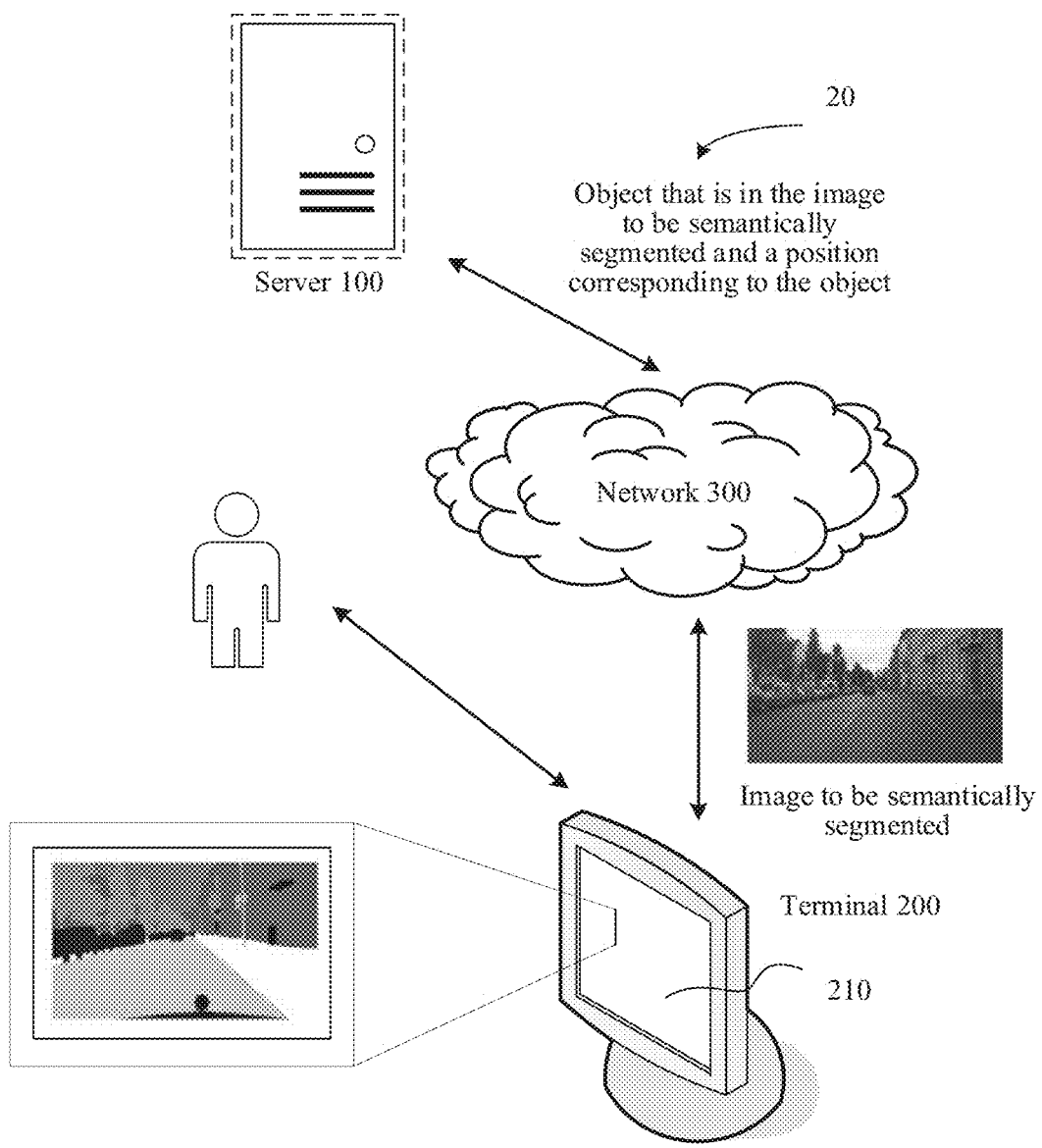
FIG. 7 is a schematic diagram of an application scenario of an image semantic segmentation system 20 according to an embodiment of this application.

Based on the foregoing descriptions of the semantic segmentation network structure generation method and the structure, the following describes an exemplary application of an electronic device for image semantic segmentation provided by the embodiments of this application. As an example, referring to FIG. 7, FIG. 7 is a schematic diagram of an application scenario of an image semantic segmentation system 20 according to an embodiment of this application. A terminal 200 is connected to a server 100 through a network 300. The network 300 may be a wide area network or a local area network, or a combination of the two.

In some embodiments, the terminal 200 locally executes the image semantic segmentation method provided by the embodiments of this application, to obtain, based on an image entered by a user and to be semantically segmented, an object that is in the image to be semantically segmented and a position corresponding to the object. For example, a semantic segmentation assistant is installed on the terminal 200. The user enters, in the semantic segmentation assistant, the image to be semantically segmented. The terminal 200 obtains, based on the inputted image to be semantically segmented, the object that is in the image to be semantically segmented and the position corresponding to the object, and displays the object that is in the image to be semantically segmented and the position corresponding to the object on a display interface 210 of the terminal 200.

In some embodiments, the terminal 200 may alternatively send the image entered by the user on the terminal 200 and to be image to be semantically segmented to the server 100 through the network 300 and invokes a semantic segmentation function provided by the server 100. The server 100 obtains an object that is in the image to be semantically segmented and a position corresponding to the object by using the image semantic segmentation method provided by the embodiments of this application. For example, a semantic segmentation assistant is installed on the terminal 200. The user enters the image to be semantically segmented in the semantic segmentation assistant. The terminal 200 sends the image to be semantically segmented to the server 100 through the network 300. The server 100 receives the image to be semantically segmented, performs recognition processing on the image to be semantically segmented, to obtain the object that is in the image to be semantically segmented and the position corresponding to the object, and returns the object that is in the image to be semantically segmented and the position corresponding to the object to the semantic segmentation assistant, which then displays the object that is in the image to be semantically segmented and the position corresponding to the object on the display interface 210 of the terminal 200, or the server 100 directly provides the object that is in the image to be semantically segmented and the position corresponding to the object.

Figure 8:
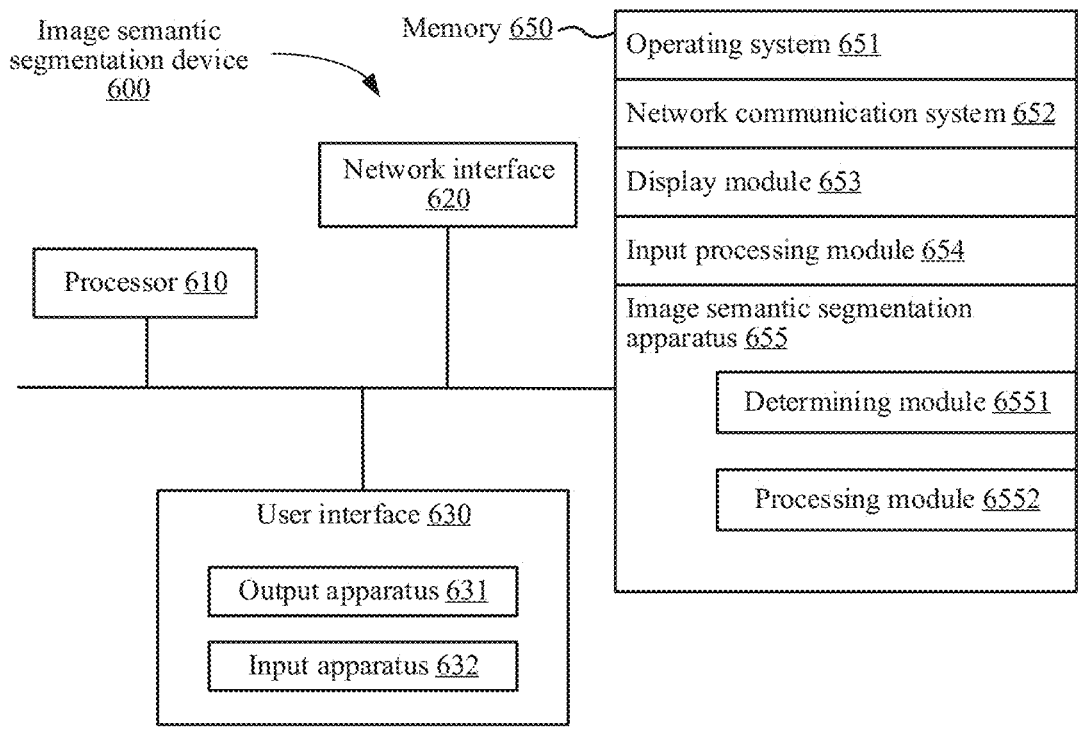
FIG. 8 is a schematic structural diagram of an electronic device 600 for image semantic segmentation according to an embodiment of this application.

Description is provided based on the described image semantic segmentation system. Referring to FIG. 8, FIG. 8 is a schematic structural diagram of an electronic device 600 for image semantic segmentation according to an embodiment of this application. The electronic device 600 for image semantic segmentation shown in FIG. 8 includes: at least one processor 610, a memory 650, at least one network interface 620, and a user interface 630. Functions of the processor 610, the memory 650, the at least one network interface 620, and the user interface 630 are similar to the functions of the processor 510, the memory 550, the at least one network interface 520, and the user interface 530, respectively. That is, the functions of the output apparatus 631 and the input apparatus 632 are similar to the functions of the output apparatus 531 and the input apparatus 532, and the functions of the operating system 651, the network communication module 652, the display module 653, and the input processing module 654 are similar to the functions of the operating system 551, the network communication module 552, the display module 553, and the input processing module 554, respectively. Details are not repeated herein.

In other embodiments, the image semantic segmentation apparatus provided by the embodiments of this application can be implemented in a software mode. FIG. 8 shows an image semantic segmentation apparatus 655 stored in the memory 650, which may be software in the form of programs and plug-ins, and includes a series of modules, including a determining module 6551 and a processing module 6552. The determining module 6551 and the processing module 6552 are configured to implement the image semantic segmentation method provided by the embodiments of this application.

It is to be understood from the foregoing that the image semantic segmentation method provided by the embodiments of this application may be implemented by various types of electronic devices for image semantic segmentation, such as an intelligent terminal, a server, or the like.

Figure 9:
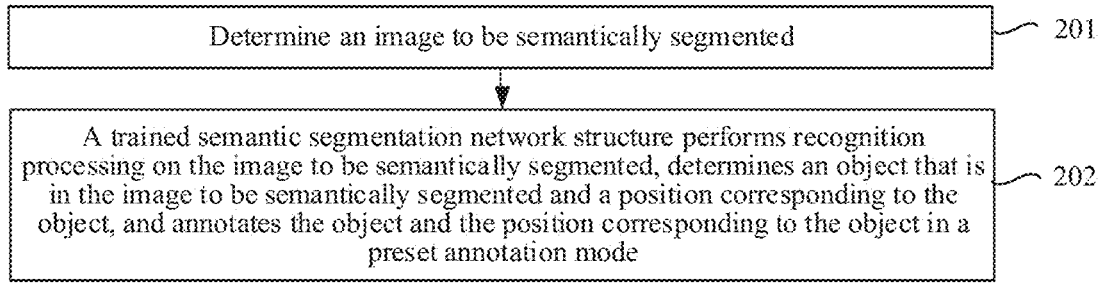
FIG. 9 is a schematic flowchart of an image semantic segmentation method according to an embodiment of this application.

The image semantic segmentation method provided by the embodiments of this application is described below in combination with the exemplary application and implementation of the server provided by the embodiments of this application. Referring to FIG. 9, FIG. 9 is a schematic flowchart of an image semantic segmentation method according to an embodiment of this application. Description is provided below by combining the steps shown in FIG. 9.

Step 201. Determine an image to be semantically segmented.

For example, a user enters, on the terminal, an image to be semantically segmented, and after inputting is completed, the terminal may alternatively send the image entered by the user on the terminal and to be semantically segmented to the server through the network. After receiving the image to be semantically segmented, the server may determine the image to be semantically segmented, for semantic segmentation.

Step 202. A trained semantic segmentation network structure performs recognition processing on the image to be semantically segmented, determines an object that is in the image to be semantically segmented and a position corresponding to the object, and annotates the object and the position corresponding to the object in a preset annotation mode.

After reduction processing is performed, by a super cell in the trained semantic segmentation network structure, on the image to be semantically segmented, feature fusion is performed by the aggregation cell on an output of the super cell, to obtain a fused feature map, then recognition processing is further performed on the fused feature map, to determine the object that is in the image to be semantically segmented and the position corresponding to the object, and the object and the position corresponding to the object are annotated in a preset annotation mode, for the user to view an image obtained after semantic segmentation. The preset annotation mode may be to annotate different objects by using different colors, to annotate objects that are in an image to be semantically segmented by using annotation boxes, or to annotate objects along edges of an object by using a dashed line box. The preset annotation mode in the embodiments of this application is not limited to the above annotation mode.

In some embodiments, performing, by the aggregation cell, feature fusion on an output of the super cell, to obtain a fused feature map includes: performing, by a reduction cell of the super cell, reduction processing on an inputted feature map, to obtain a feature map corresponding to the super cell; sequentially performing, by a reduction cell in the aggregation cell, reduction processing on the feature map outputted by the super cell, to obtain a plurality of feature maps having a same resolution corresponding to the super cell; and performing fusion processing on the plurality of feature maps having the same resolution, to obtain the fused feature map.

In some embodiments, performing, by a reduction cell of the super cell, reduction processing on an inputted feature map, to obtain a feature map corresponding to the super cell includes: determining an $i^{th}$ super cell; and performing, by the $i^{th}$ super cell, reduction processing on the inputted feature map, to obtain the feature map corresponding to the $i^{th}$ super cell.

For example, sequentially performing, by a reduction cell in the aggregation cell, reduction processing on the feature map outputted by the super cell, to obtain feature maps having a same resolution corresponding to the super cell includes: performing, by N−i reduction cells in the aggregation cell, reduction processing on the $i^{th}$ super cell for N−i times, to obtain reduction feature maps corresponding to the $i^{th}$ super cell, where the reduction feature maps corresponding to the N super cells have a same resolution.

In some embodiments, performing recognition processing on the fused feature map, to determine an object that is in the image to be semantically segmented and a position corresponding to the object includes: performing feature mapping on the fused feature map, to obtain a mapped feature map corresponding to the image to be semantically segmented; and performing recognition processing on the mapped feature map corresponding to the image to be semantically segmented, to obtain the object that is in the image to be semantically segmented and the position corresponding to the object.

The image semantic segmentation method provided by the embodiments of this application has been described. The following continuously describes the solution in which modules of an image semantic segmentation apparatus 655 provided by the embodiments of this application collaborate to implement image semantic segmentation.

A determining module 6551 is configured to determine an image to be semantically segmented.

A processing module 6552 is configured to perform, by using a trained semantic segmentation network structure, recognition processing on the image to be semantically segmented, determine an object that is in the image to be semantically segmented and a position corresponding to the object, and annotate the object and the position corresponding to the object in a preset annotation mode.

The foregoing descriptions related to the apparatuses are similar to the descriptions of the foregoing methods. For the descriptions of beneficial effects of the same methods, details are not described again. For technical details of the apparatuses not disclosed in the embodiments of this application, refer to the descriptions of the method embodiments in this application. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

An embodiment of this application further provides a non-transitory computer-readable storage medium, storing executable instructions, the executable instructions, when executed by a processor, implementing the semantic segmentation network structure generation method provided by the embodiments of this application, for example, the semantic segmentation network structure generation method shown in FIG. 3 to FIG. 6, or the image semantic segmentation method provided by the embodiments of this application, for example, the image semantic segmentation method shown in FIG. 9.

In some embodiments, the computer-readable storage medium may be a memory such as an FRAM, an ROM, a PROM, an EPROM, an EEPROM, a flash memory, a magnetic memory, a compact disc, or a CD-ROM; or may be various devices including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program for being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specifically used for a program in discussion, or stored in the plurality of collaborative files (for example, be stored in files of one or more of modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The following describes an exemplary application of this embodiment of this application in an actual application scenario.

To resolve the problems caused by the manually designed network structure and the neural network search method, the embodiments of this application provide the semantic segmentation network structure generation method, in which original cells are constructed into a plurality of super cells based on different reduction stages, an architectural parameter of the super cells is introduced, and a quantity of cells in each stage is adaptively adjusted based on the architectural parameter; in addition, an aggregation cell is constructed for the aggregation of context features in image segmentation, thereby better fusing the features in different scales. By the method, a real-time semantic segmentation network having a high transmission frames per second (FPS) and high performance can be generated in semantic segmentation, and can be used in real-time fields such as autonomous driving and mobile phones.

Figure 10:
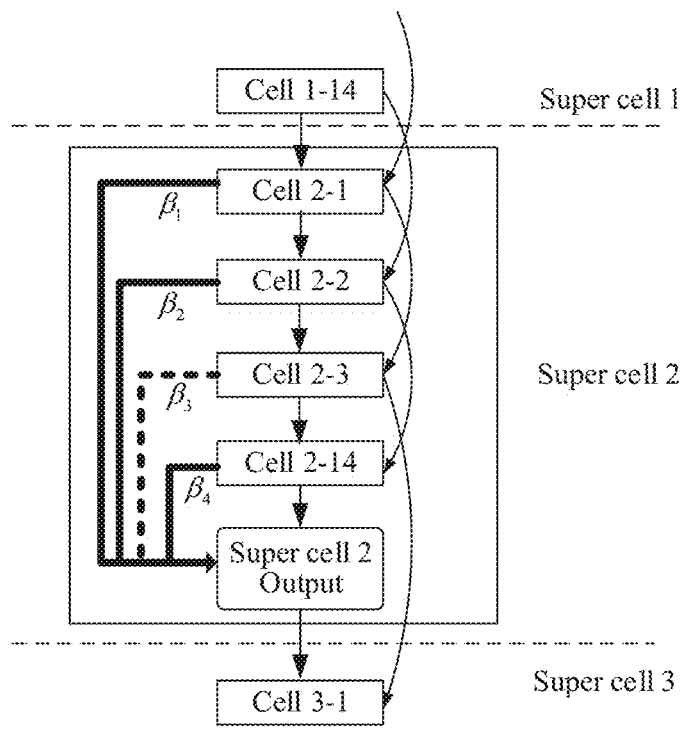
FIG. 10 is a schematic diagram of a super cell structure according to an embodiment of this application.

For the matter of semantic segmentation, the reduction strategy (performing reduction where appropriate) is very critical, and this process is modeled as a cell-level pruning process. As shown in FIG. 10, FIG. 10 is a schematic diagram of a super cell structure provided by the embodiments of this application. Original cell structure is divided into a plurality of super cells based on different reduction stages (resolutions), and the cell structures having the same resolution are in the same super cell, and an architectural parameter is introduced between the cells. In addition, for the matter of semantic segmentation, feature fusion of different scales is also very important. For high-resolution spatial information (an output of a front super cell) and low-resolution semantic information (an output of a later super cell), the features can be effectively fused adaptively by establishing the aggregation cell, thereby improving the performance of real-time segmentation network.

The implementation of the embodiments of this application is divided into three stages, respectively: 1) cell-level pruning; 2) aggregation cell search; 3) network pre-training and re-training.

1) Cell-Level Pruning

As shown in FIG. 10, the cells in the same stage (resolution) are combined into a super cell, a cell-level architectural parameter $\beta$ is introduced, outputs by all the cells in the super cell are fused, and the output of the whole super cell is denoted as a combination of the outputs of the cells. A formula for calculating the output of the super cell is shown by Formula (1):

$$\text{Output\_\{super\_cell\}} = \Sum_{k=1}^{n} f(x^k) * \beta_k \quad (1)$$

where, $f(x^k)$ represents a feature outputted by the $k^{th}$ cell in the super cell, $\beta_k$ represents the architectural parameter of the $k^{th}$ cell, n represents a quantity of the cells, and Output_{super_cell} represents the output of the super cell.

The sampling mode of the architectural parameter is class variational self-encoder (Gumbel Softmax), and the Gumbel Softmax is optimized to one-hot encoding in the training process. By introducing the cell-level architectural parameter $\beta_k$, joint training is performed on the cell-level architectural parameter $\beta_k$, a parameter of the network, and an original architectural parameter $\lambda$ of the cells (any operation in a set of candidate operations), to update the three parameters in the same round of back-propagation. After the final optimization is completed, as shown in FIG. 10, if the maximum value of the architectural parameter is shown by the dashed line $\beta_3$, the following cell (the cell 2-4) is to be discarded, thereby implementing dynamic adjustment of the depth of the network.

Figure 11:
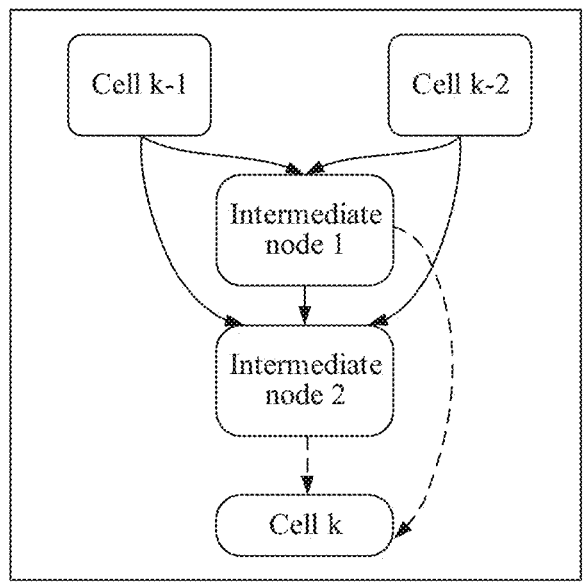
FIG. 11 is a schematic diagram of a cell structure according to an embodiment of this application.

As shown in FIG. 11, FIG. 11 is a schematic diagram of a cell structure according to an embodiment of this application. The cell in the embodiments of this application is composed of at least one node in a neural network. The cell in the embodiments of this application may be composed of two nodes (a first intermediate node 1 and a second intermediate node 2). For example, output results of the $(k-1)^{th}$ cell and the $(k-2)^{th}$ cell are inputted to the first intermediate node 1 in the $k^{th}$ cell and are processed by the first intermediate node 1, then an output result of the first intermediate node 1 is inputted to the second intermediate node 2 and is processed by the second intermediate node 2, and then an output result of the second intermediate node 2 is inputted to the $(k+1)^{th}$ cell and the $(k+2)^{th}$ cell. The solid lines represent any operation in the set of candidate operations and the dashed line represents an output.

Figure 12:
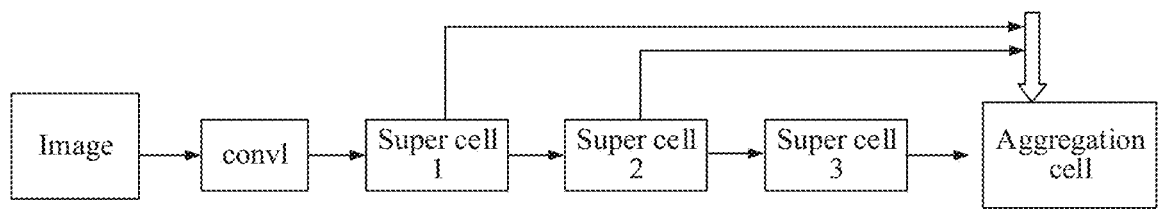
FIG. 12 is a schematic diagram of a semantic segmentation network structure according to an embodiment of this application.

As shown in FIG. 12, FIG. 12 is a schematic diagram of a semantic segmentation network structure according to an embodiment of this application. The input is an image. The image first goes through a layer of convolutional neural network (CNN) with a reduction being 2, and then passes through three successive super cells, where the $1^{st}$ cell of each super cell is a reduction cell, and the rest cells are normal cells. The whole semantic segmentation network structure reduces the image by 16 times, and finally outputs of the three super cells are combined and then inputted to the aggregation cell.

The set of candidate operations of the reduction cells and the normal cells may include a mean-pooling layer, a max-pooling layer, a 1×1 convolutional layer, identical mapping, a 3×3 convolutional layer, a 3×3 dilated convolution, 5×5 dilated convolution, 3×3 group convolution, or the like. That is, the reduction cells and the normal cells may be formed by any operation in the set of candidate operations.

2) Aggregation Cell Search

Figure 13:
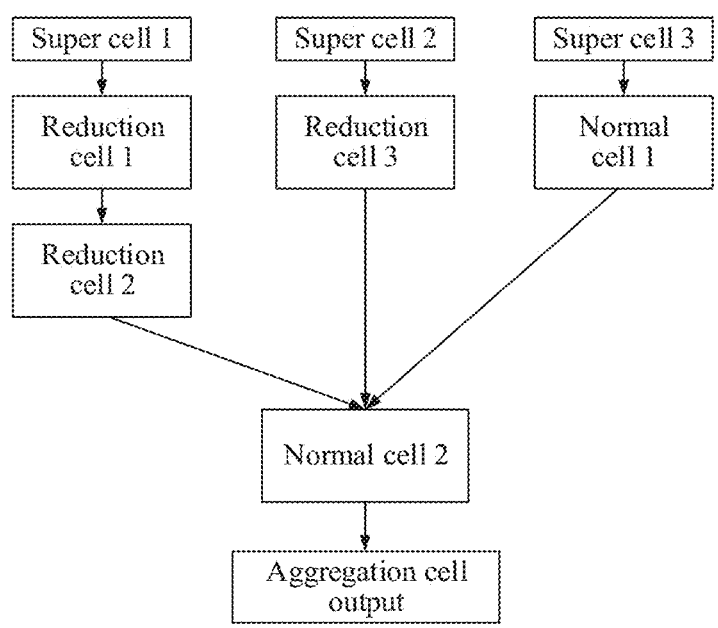
FIG. 13 is a schematic diagram of an aggregation cell structure according to an embodiment of this application.

In the embodiments of this application, feature maps having different resolutions are fused by using an aggregation cell, low-level spatial features (an output of a front super cell, for example, the super cell 1) and deep-level semantic information (an output of a later super cell, for example, the super cell 3) are fused, and the outputs of the three super cells need to respectively undergo twice, once, and 0 times of reduction, to obtain feature maps having the same size. As shown in FIG. 13, FIG. 13 is a schematic structural diagram of an aggregation cell according to an embodiment of this application. The aggregation cell is formed by five cells in total. There are two reduction cells corresponding to the $1^{st}$ super cell, there is one reduction cell corresponding to the $2^{nd}$ super cell, and there is one normal cell corresponding to the $3^{rd}$ super cell, and outputs of a reduction cell 2, a reduction cell 3, and a normal cell 1 are inputted to a normal cell 2, that is, the features outputted by the three super cells are processed into the same size, and then the features are spliced to effectively and adaptively fuse the features, thereby improving the performance of the real-time segmentation network.

The set of candidate operations of the aggregation cell may include a mean-pooling layer, a max-pooling layer, a 1×1 convolutional layer, identical mapping, a 3×3 convolutional layer, a 3×3 dilated convolution, a 3×3 group convolution and channel attention mechanism layer, a spatial attention mechanism layer, or the like. That is, the cells in the aggregation cell may be formed by any operation in the set of candidate operations.

3) Network Pre-Training and Re-Training

In the embodiments of this application, a complete neural network structure (the improved semantic segmentation network structure) can be obtained based on the structures searched in the first two stages, and an ImageNet data set is used for pre-training to improve the generalization capability of the network structure and better initialize the parameters of the network structure. Then, the network structure is retrained on a segmented data set to get a more efficient semantic segmentation network structure (the trained semantic segmentation network structure).

After determining the trained semantic segmentation network structure through pre-training and retraining, based on an image entered by a user and to be semantically segmented, recognition processing may be performed on the image to be semantically segmented by using the trained semantic segmentation network structure, to determine an object that is in the image to be semantically segmented and a position corresponding to the object, and the object and the position corresponding to the object are annotated in a preset annotation mode, thereby obtaining a semantically segmented image.

In the embodiments of this application, on the one hand, the original cells can be grouped into super cells based on different reduction stages, and a differentiable architectural parameter in a super cell level is introduced, to adaptively determine a quantity of cells in each stage (super cell) by cell-level pruning; and on the other hand, for feature fusion at different scales, the aggregation cell adaptively fuses features at different scales, thereby generating a more efficient semantic segmentation network structure.

In conclusion, by removing a redundant cell from a super cell to which a target cell corresponding to a maximum value of the architectural parameter pertains and performing feature fusion on outputs of the super cell from which the redundant cell is removed, the embodiments of this application have the following beneficial effects:

By removing a redundant cell from a super cell to which a target cell pertains, a redundant calculation cell is removed from the semantic segmentation network structure, the calculation amount of subsequent semantic segmentation is reduced, the semantic segmentation network structure is dynamically adjusted, and the depth of the semantic segmentation network structure is reduced; by removing the redundant cell from the super cell to which the target cell pertains, a position of the reduction cell of the super cell in the semantic segmentation network structure is determined, and therefore reduction is performed at a proper position; and by performing, by an aggregation cell, feature fusion on an output of the super cell from which the redundant cell is removed, outputs of the super cells having different resolutions can be fused adaptively, thereby improving the performance of real-time segmentation and being suitable for various semantic segmentation application scenarios.

The foregoing descriptions are merely embodiments of this application and are not intended to limit the protection scope of this application. Any modification, equivalent replacement, or improvement made without departing from the spirit and range of this application shall fall within the protection scope of this application.

INDUSTRIAL APPLICABILITY

The electronic device in the embodiments of this application optimizes the semantic segmentation network structure based on image samples, to remove a redundant cell, performs, by using an aggregation cell in the improved semantic segmentation network structure, feature fusion on an output of the super cell from which the redundant cell is removed, recognizes the fused feature map, to determine positions corresponding to objects that are in the image samples, and trains the improved semantic segmentation network structure based on the positions corresponding to the objects that are in the image samples, to generate a trained semantic segmentation network structure.

What is claimed is:

1. A semantic segmentation network structure generation method performed by an electronic device, the semantic segmentation network structure comprising a super cell and an aggregation cell, and the method comprising:
   generating a corresponding architectural parameter for cells that form the super cell in the semantic segmentation network structure;
   optimizing the semantic segmentation network structure based on image samples, and removing a redundant cell from the super cell to which a target cell pertains, to obtain an improved semantic segmentation network structure, the target cell being a cell having a maximum architectural parameter among the cells;
   performing, by the aggregation cell in the improved semantic segmentation network structure, feature fusion on an output of the super cell from which the redundant cell is removed, to obtain a fused feature map;
   performing recognition processing on the fused feature map, to determine positions corresponding to objects that are in the image samples; and
   training the improved semantic segmentation network structure based on the positions corresponding to the objects that are in the image samples and annotations corresponding to the image samples, to obtain a trained semantic segmentation network structure.

2. The method according to claim 1, further comprising:
   before generating the corresponding architectural parameter for the cells that form the super cell in the semantic segmentation network structure:
   combining cells having a same resolution in the semantic segmentation network structure into the super cell; and
   determining a structure of the aggregation cell according to a quantity N of super cells.

3. The method according to claim 2, wherein the determining the structure of the aggregation cell according to the quantity N of the super cells comprises:
   determining the quantity N of the super cells; and
   determining a quantity of reduction cells in the aggregation cell and corresponding to an $i^{th}$ super cell to be N−i, wherein
   N is a positive integer greater than or equal to 2, i is a positive integer, and i is less than or equal to N.

4. The method according to claim 3, wherein the performing, by the aggregation cell in the improved semantic segmentation network structure, feature fusion on the output of the super cell from which the redundant cell is removed, to obtain the fused feature map comprises:
   performing, by a reduction cell of the super cell in the improved semantic segmentation network structure, reduction processing on an inputted feature map, to obtain a feature map corresponding to the super cell;
   sequentially performing, by a reduction cell in the aggregation cell, reduction processing on a feature map outputted by the super cell from which the redundant cell is removed, to obtain a plurality of feature maps having a same resolution and corresponding to the super cell; and
   performing fusion processing on the plurality of feature maps having the same resolution, to obtain the fused feature map.

5. The method according to claim 4, wherein the performing, by the reduction cell of the super cell in the improved semantic segmentation network structure, reduction processing on the inputted feature map, to obtain the feature map corresponding to the super cell comprises:
   determining the $i^{th}$ super cell in the improved semantic segmentation network structure and from which the redundant cell is removed; and
   performing, by the $i^{th}$ super cell, reduction processing on the inputted feature map, to obtain a feature map corresponding to the $i^{th}$ super cell; and
   the sequentially performing, by the reduction cell in the aggregation cell, reduction processing on the feature map outputted by the super cell from which the redundant cell is removed, to obtain the plurality of feature maps having the same resolution and corresponding to performing, by N−i reduction cells in the aggregation cell, reduction processing on the $i^{th}$ super cell for N−i times, to obtain reduction feature maps corresponding to the $i^{th}$ super cell, wherein
   reduction feature maps of the N super cells have a same resolution.

6. The method according to claim 1, wherein the generating the corresponding architectural parameter for the cells that form the super cell in the semantic segmentation network structure comprises:
   determining a quantity M of the cells that form the super cell in the semantic segmentation network structure; and
   generating the corresponding architectural parameter with a value of 1/M for the cells that form the super cell in the semantic segmentation network structure.

7. The method according to claim 1, wherein the optimizing the semantic segmentation network structure based on the image samples comprises:
   performing joint training on a parameter of the semantic segmentation network structure, and an operating parameter and the corresponding architectural parameter for the cells based on the image samples, determining the maximum architectural parameter obtained after the joint training, and
   determining a cell corresponding to the maximum architectural parameter as the target cell.

8. The method according to claim 7, wherein the determining the maximum architectural parameter obtained after the joint training and determining the cell corresponding to the maximum architectural parameter as the target cell comprises:
   determining a cell corresponding to the architectural parameter being 1 that is obtained after the joint training as the target cell.

9. The method according to claim 1, wherein the removing the redundant cell from the super cell to which the target cell pertains, to obtain the improved semantic segmentation network structure comprises:
   determining an order j of the target cell in the super cell to which the target cell pertains and removing at least one redundant cell after the order j from the super cell; and
   constructing the improved semantic segmentation network structure based on the super cell from which the at least one redundant cell is removed and the aggregation cell.

10. The method according to claim 1, wherein the performing recognition processing on the fused feature map, to determine the positions corresponding to the objects that are in the image samples comprises:
    performing feature mapping on the fused feature map, to obtain a mapped feature map corresponding to the image samples; and performing recognition processing on the mapped feature map corresponding to the image samples, to determine the positions corresponding to the objects that are in the image samples; and the training the improved semantic segmentation network structure based on the positions corresponding to the objects that are in the image samples and the annotations corresponding to the image samples comprises:

constructing a loss function of the improved semantic segmentation network structure based on the positions corresponding to the objects that are in the image samples and the annotations corresponding to the image samples; and updating a parameter of the improved semantic segmentation network structure until the loss function converges.

11. The method according to claim 1, further comprising:
determining an image to be semantically segmented;
performing, by using the trained semantic segmentation network structure, recognition processing on the image to be semantically segmented, and determining an object that is in the image to be semantically segmented and a position corresponding to the object; and
annotating the object and the position corresponding to the object in a preset annotation mode.

12. An electronic device, comprising:
a memory, configured to store executable instructions; and
a processor, configured to, when executing the executable instructions stored in the memory, perform a plurality of operations including:
generating a corresponding architectural parameter for cells that form a super cell in a semantic segmentation network structure;
optimizing the semantic segmentation network structure based on image samples, and removing a redundant cell from the super cell to which a target cell pertains, to obtain an improved semantic segmentation network structure, the target cell being a cell having a maximum architectural parameter among the cells;
performing, by an aggregation cell in the improved semantic segmentation network structure, feature fusion on an output of the super cell from which the redundant cell is removed, to obtain a fused feature map;
performing recognition processing on the fused feature map, to determine positions corresponding to objects that are in the image samples; and
training the improved semantic segmentation network structure based on the positions corresponding to the objects that are in the image samples and annotations corresponding to the image samples, to obtain a trained semantic segmentation network structure.

13. The electronic device according to claim 12, wherein the plurality of operations further comprise:
before generating the corresponding architectural parameter for the cells that form the super cell in the semantic segmentation network structure:
combining cells having a same resolution in the semantic segmentation network structure into the super cell; and
determining a structure of the aggregation cell according to a quantity of super cells.

14. The electronic device according to claim 12, wherein the generating the corresponding architectural parameter for the cells that form the super cell in the semantic segmentation network structure comprises:

determining a quantity M of the cells that form the super cell in the semantic segmentation network structure; and
generating the corresponding architectural parameter with a value of 1/M for the cells that form the super cell in the semantic segmentation network structure.

15. The electronic device according to claim 12, wherein the optimizing the semantic segmentation network structure based on the image samples comprises:
performing joint training on a parameter of the semantic segmentation network structure, and an operating parameter and the corresponding architectural parameter for the cells based on the image samples, determining the maximum architectural parameter obtained after the joint training, and
determining a cell corresponding to the maximum architectural parameter as the target cell.

16. The electronic device according to claim 12, wherein the removing the redundant cell from the super cell to which the target cell pertains, to obtain the improved semantic segmentation network structure comprises:
determining an order j of the target cell in the super cell to which the target cell pertains and removing at least one redundant cell after the order j from the super cell; and
constructing the improved semantic segmentation network structure based on the super cell from which the at least one redundant cell is removed and the aggregation cell.

17. The electronic device according to claim 12, wherein the performing recognition processing on the fused feature map, to determine the positions corresponding to the objects that are in the image samples comprises:
performing feature mapping on the fused feature map, to obtain a mapped feature map corresponding to the image samples; and
performing recognition processing on the mapped feature map corresponding to the image samples, to determine the positions corresponding to the objects that are in the image samples; and
the training the improved semantic segmentation network structure based on the positions corresponding to the objects that are in the image samples and the annotations corresponding to the image samples comprises:
constructing a loss function of the improved semantic segmentation network structure based on the positions corresponding to the objects that are in the image samples and the annotations corresponding to the image samples; and
updating a parameter of the improved semantic segmentation network structure until the loss function converges.

18. The electronic device according to claim 12, wherein the plurality of operations further comprise:
determining an image to be semantically segmented;
performing, by using the trained semantic segmentation network structure, recognition processing on the image to be semantically segmented, and determining an object that is in the image to be semantically segmented and a position corresponding to the object; and
annotating the object and the position corresponding to the object in a preset annotation mode.

19. A non-transitory computer-readable storage medium, storing executable instructions, the executable instructions, when executed by a processor of an electronic device, causing the electronic device to perform a plurality of operations including:

generating a corresponding architectural parameter for cells that form a super cell in a semantic segmentation network structure;

optimizing the semantic segmentation network structure based on image samples, and removing a redundant cell from the super cell to which a target cell pertains, to obtain an improved semantic segmentation network structure, the target cell being a cell having a maximum architectural parameter among the cells;

performing, by an aggregation cell in the improved semantic segmentation network structure, feature fusion on an output of the super cell from which the redundant cell is removed, to obtain a fused feature map;

performing recognition processing on the fused feature map, to determine positions corresponding to objects that are in the image samples; and training the improved semantic segmentation network structure based on the positions corresponding to the objects that are in the image samples and annotations corresponding to the image samples, to obtain a trained semantic segmentation network structure.

20. The non-transitory computer-readable storage medium according to claim 19, wherein the plurality of operations further comprise:

determining an image to be semantically segmented;

performing, by using the trained semantic segmentation network structure, recognition processing on the image to be semantically segmented, and determining an object that is in the image to be semantically segmented and a position corresponding to the object; and annotating the object and the position corresponding to the object in a preset annotation mode.

* * * * *